United States Patent [19]
Umeno et al.

[11] Patent Number: 5,392,409
[45] Date of Patent: Feb. 21, 1995

[54] I/O EXECUTION METHOD FOR A VIRTUAL MACHINE SYSTEM AND SYSTEM THEREFOR

[75] Inventors: Hidenori Umeno, Kanagawa; Takashige Kubo, Hachioji; Nobutaka Hagiwara, Fujisawa; Hiroaki Sato; Hideo Sawamoto, both of Hadano; Taro Inoue; Shunji Tanaka, both of Sagamihara, all of Japan

[73] Assignee: Hitachi, Ltd., Tokyo, Japan

[21] Appl. No.: 851,629

[22] Filed: Mar. 16, 1992

Related U.S. Application Data

[63] Continuation-in-part of Ser. No. 369,535, Jun. 21, 1989, Pat. No. 5,109,489, which is a continuation of Ser. No. 691,909, Jan. 16, 1985, Pat. No. 4,885,681.

[30] Foreign Application Priority Data

Jan. 18, 1984 [JP] Japan .................. 59-5587

[51] Int. Cl.⁶ .......................................... G06F 12/00
[52] U.S. Cl. ......................... 395/400; 395/275; 395/700; 364/DIG. 1
[58] Field of Search ............... 395/400, 275, 425, 700

[56] References Cited

U.S. PATENT DOCUMENTS

| | | | |
|---|---|---|---|
| 4,253,145 | 2/1981 | Goldberg | 395/400 |
| 4,285,040 | 2/1981 | Carlson et al. | 395/400 |
| 4,400,769 | 8/1983 | Kaneda et al. | 395/400 |
| 4,456,954 | 6/1984 | Bulliant, III et al. | 395/400 |
| 4,459,661 | 7/1984 | Kaneda et al. | 395/400 |
| 4,494,189 | 1/1985 | Bean et al. | 395/400 |
| 4,533,996 | 8/1985 | Hartung et al. | 395/400 |
| 5,088,031 | 2/1992 | Takasaki et al. | 395/400 |

FOREIGN PATENT DOCUMENTS 53-142137 12/1978 Japan .

OTHER PUBLICATIONS

370–XA Principles of Operation, IBM SA22–7085–0, pp. 13–1 to 13–9, 1983.
Virtual Machine/Extended Architecture Migration Aid General Information Manual, IBM GC19–6R13–0, pp. 1–31, 1982.

*Primary Examiner*—Rebecca L. Rudolph
*Attorney, Agent, or Firm*—Antonelli, Terry, Stout & Kraus

[57] ABSTRACT

In a computer system having a central processing unit, a main storage and at least one I/O device, a plurality of operating systems (OS) can simultaneously run under the control of a control program. For executing an I/O instruction using a central processing unit, a plurality of resident areas of said main storage which do not overlap one another are assigned, under the control of the control program, to the plurality of OSs as main memories therefore, respectively. In responding to an I/O instruction issued by a running one of said plural OSs, an address of said main memory assigned to said running OS which participates in an I/Oo operation requested by said I/O instruction is determined without intervention of the control program, and the address is translated into an address of the main storage of the computer system without intervention of said control program. The I/O operation is then executed by using the address resulting from said address translation.

15 Claims, 26 Drawing Sheets

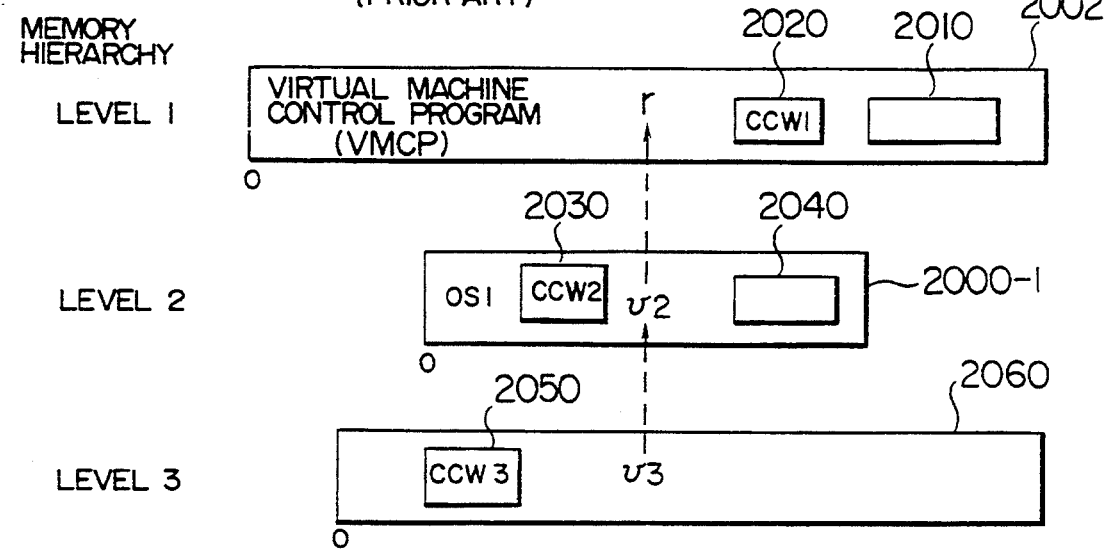
FIG. 3 (PRIOR ART)
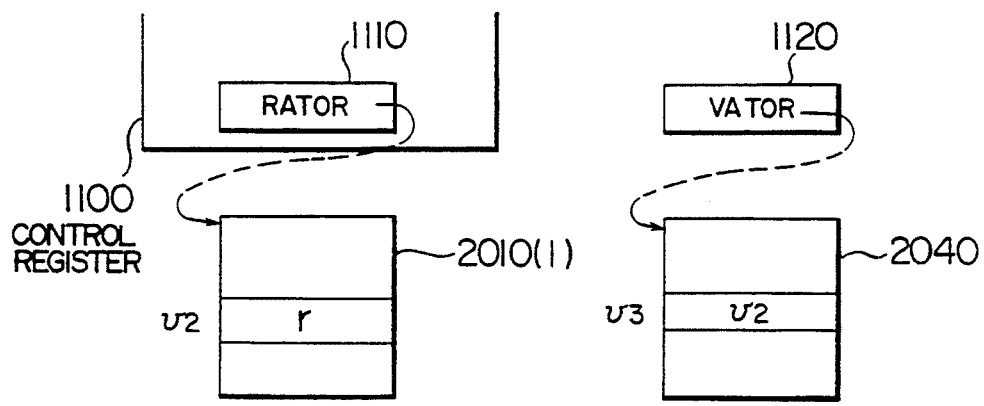
FIG. 4a (PRIOR ART)
FIG. 4b (PRIOR ART)
FIG. 4c (PRIOR ART)

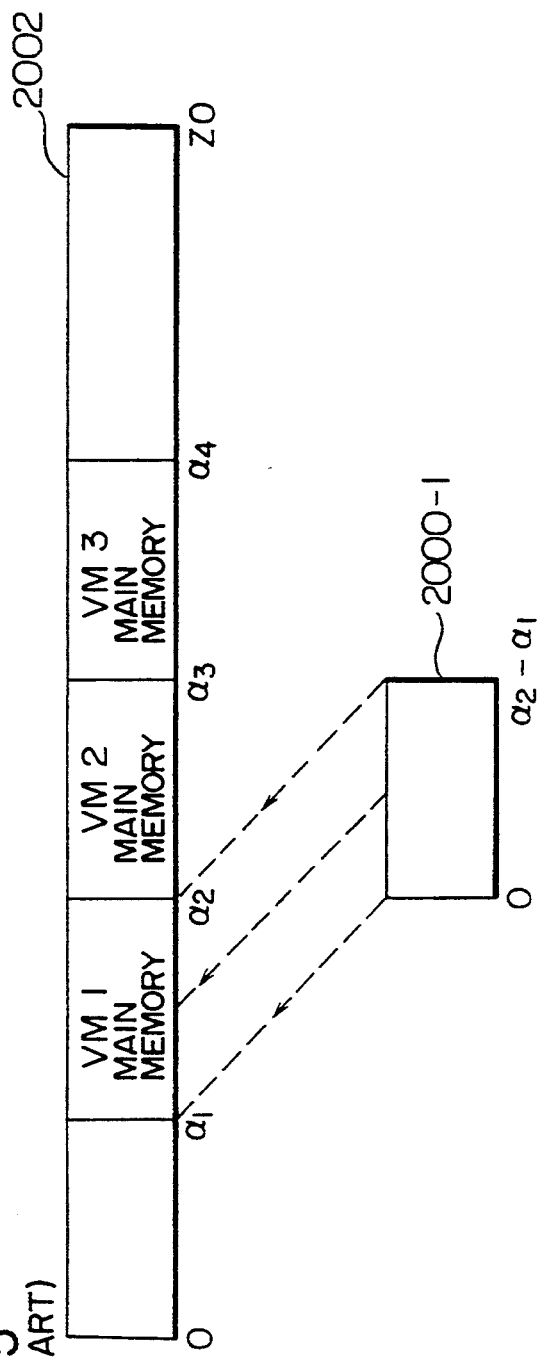
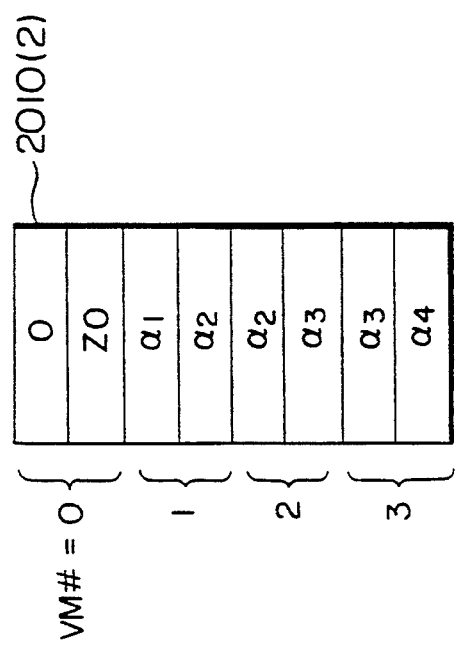
FIG. 5
(PRIOR ART)

FIG. 10
(PRIOR ART)
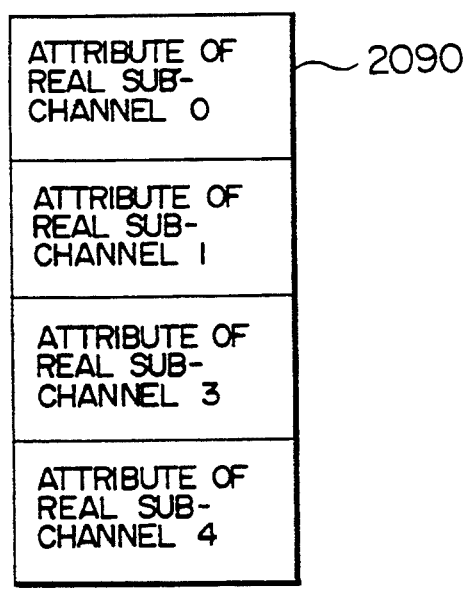
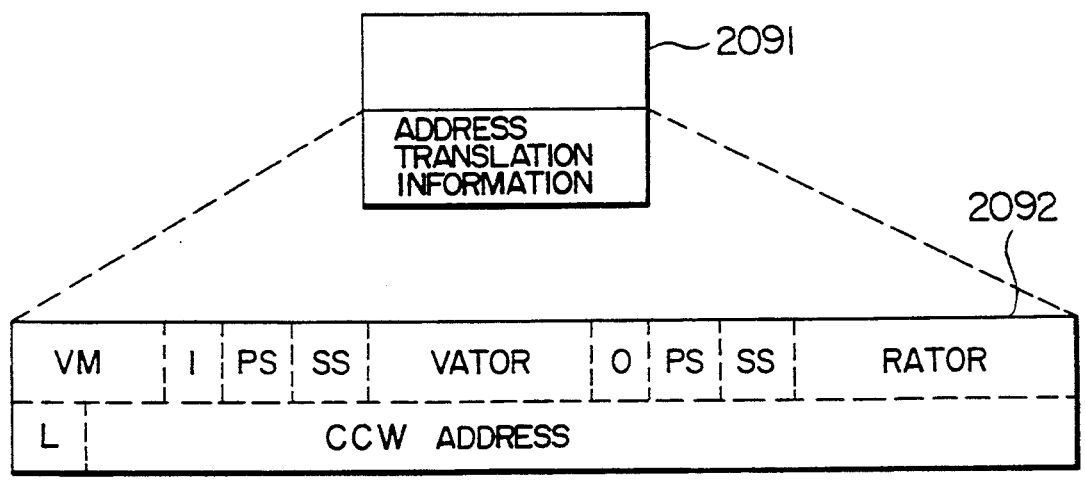

| VM | VIRTUAL INTERRUPTION PRIORITY ORDER | DEDICATION/SHARE | REAL INTERRUPTION PRIORITY ORDER | REMARK |
|---|---|---|---|---|
| 0 | 0 | DEDICATED | 0 | DEDICATED TO VMCP |
| 1 | 0 | DEDICATED | 1 | |
| | 1~7 | SHARE | 31 | |
| 2 | 0 | DEDICATED | 2 | |
| | 1 | DEDICATED | 3 | |
| | 2~7 | SHARE | 31 | |
| 3 | 0 | DEDICATED | 4 | |
| | 1 | DEDICATED | 5 | |
| | 2~3 | SHARE | 30 | PRIORITY ORDER AMONG SHARED UNITS |
| | 4~7 | SHARE | 31 | |

FIG. 21
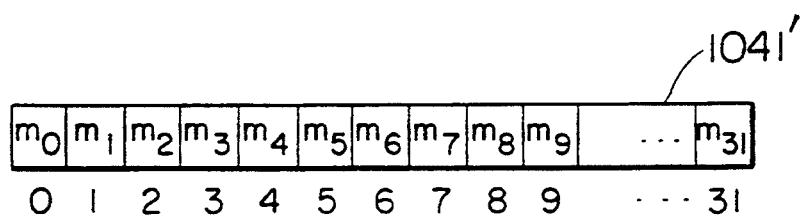
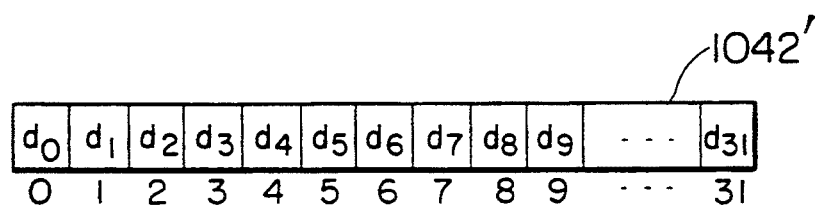
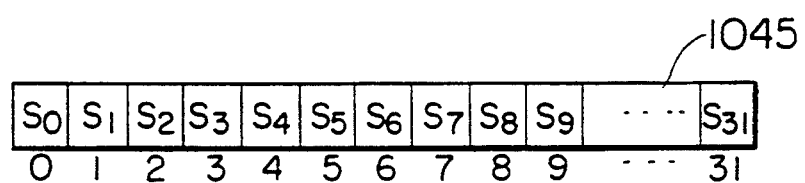
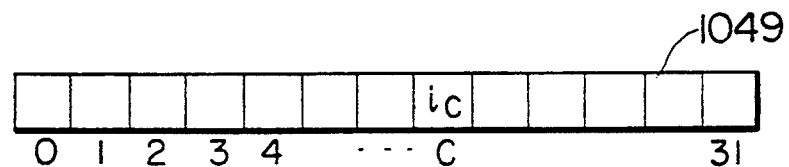

LRSW: LOGICAL RESOURCE STATUS WORD

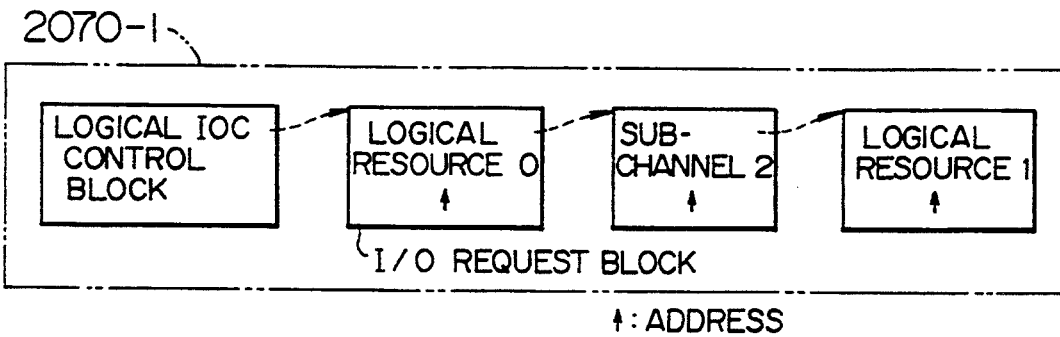

FIG. 31
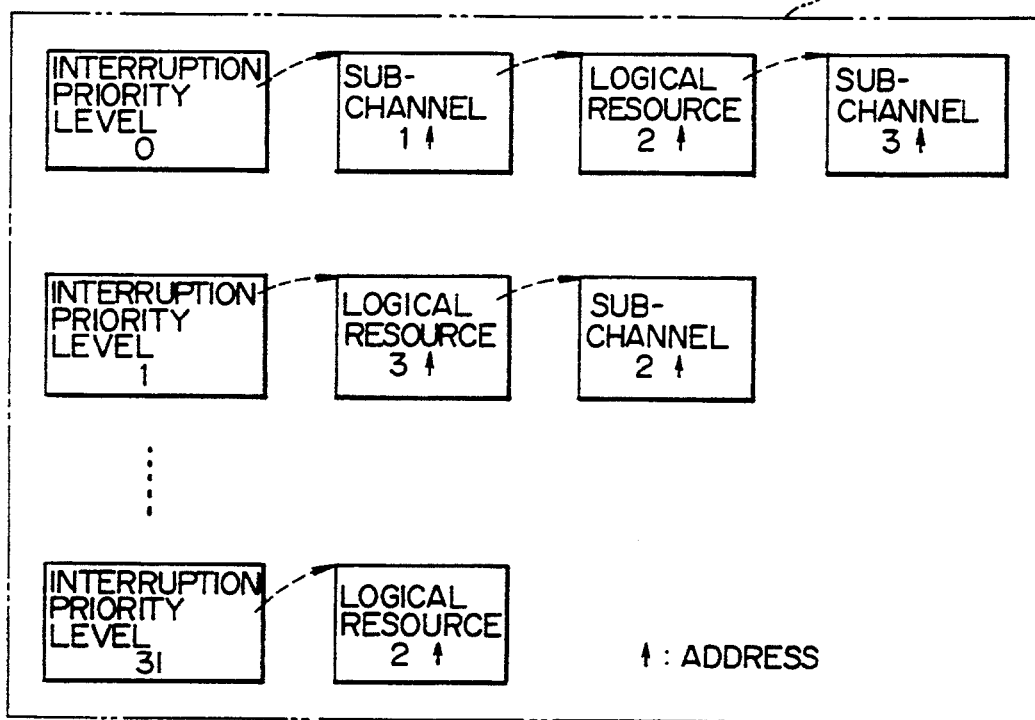
FIG. 32
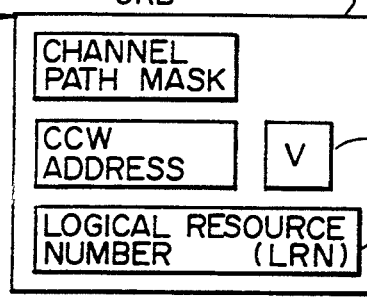
V = 1 : LRN IS VALID
V = 0 : LRN IS INVALID

I/O EXECUTION METHOD FOR A VIRTUAL MACHINE SYSTEM AND SYSTEM THEREFOR

CROSS REFERENCE TO RELATED APPLICATIONS

The present application is a continuation-in-part of application Ser. No. 369,535, filed Jun. 21, 1989, now U.S. Pat. No. 5,109,489, which was a continuation application of application Ser. No. 691,909, filed Jan. 16, 1985, now U.S. Pat. No. 4,885,681.

BACKGROUND OF THE INVENTION

The present invention relates to a high speed virtual machine system (VMS), and more particularly to method and system for reducing an I/O simulation overhead of the VMS.

The specifications of the Japanese Patent Application Kokai No. 55-76950 laid open on Jun. 24, 1975, No. 56-19153 laid open on Feb. 23, 1981 and No. 55-42326 laid open on Mar. 25, 1980 and the U.S. Pat. No. 4,459,661 (Saburo Kaneda et al., Apr. 21, 1982), which was filed with the Convention priority based on the latter Japanese Patent Application Kokai, disclose virtual machine systems.

FIG. 1 shows a configuration of a real computer system 9000. Numeral 1000 denotes a central processing unit (CPU), numeral 2000 denotes a main memory, numeral 3000 denotes an I/O processor (IOP), and numeral 4000 denotes an I/O controller (IOC). Numeral 100 denotes a signal line between the CPU 1000 and the main memory 2000, numeral 200 denotes a signal line between the CPU 1000 and the IOP 3000, numeral 300 denotes a signal line between the IOP 3000 and the main memory 2000, and numeral 400 denotes a signal line between the IOP 3000 and the IOC 4000. The real computer system 9000 is operated under a control of a resource management (CPU, main memory and I/O devices) of an overall system of an operating system (OS) on the main memory 2000.

A configuration of a virtual machine system (VMS) is shown in FIG. 2. A real computer system 10000 has a similar hardware configuration (CPU, main memory and I/O devices) as that shown in FIG. 1 but it has a VMS control program (VMCP or simply CP) on the main memory 2000. A plurality of logical machines (called virtual machines (VM)) are logical configuration by a hardware simulation function of the VMCP. The VM's 10000-1 (VM1), 10000-2 (VM2) and 10000-3 (VM3) each is logically configured to have the same hardware configuration as the real computer system (called a host system) 10000. OS-N (N=1, 2, 3) which controls the VM exists on each main memory 2000-N (N=1, 2, 3) of each VM, and those OS's run concurrently under one host system. The hardware configuration (CPU, main memory, IOP and IOC) in each VM of FIG. 2 is logically configured by the VMCP and most portions of the substance thereof exist on the corresponding hardware configuration in each virtual machine configured by the host system. For example, as its main memory, the VM may exclusively occupy a portion of the main memory 2000 of the host system or may show the main memory 2000, and as its I/O devices, the VM may share the I/O devices of the host system or may exclusively occupy the I/O device. Alternatively, there may be no corresponding I/O device on the host system and the I/O device may be virtually configured by simulation by the VMCP. In any case, the OS on the main memory 2000-N (N=1, 2, 3) on each VM can see the same hardware configuration (CPU, main memory, IOP and IOC) as that the host system has. It should be noted that an architecture (hardware configuration and function as viewed from the OS) of each VM may be somewhat different from the architecture of the host system. Similarly, the architectures of the respective VM's may be different from each other. For example, a machine instruction set of the host system may not be exactly identical to a machine instruction set of each VM. However, a completely different machine instruction set is excluded from the VMS in the present invention because it increases a load of the VMCP and increases a scale of a host system emulation mechanism. The virtual machine VM in the present invention requires that most of machine instructions can be directly executed with the same performance as that (execution speed) of the host system on the host system without intervention of the VMCP. While only three VM's are shown in FIG. 2, any number of VM's may be included and the upper limit thereof is determined by compromise between a resource capacitance of the host system and the performance of the VM. The host system has a privileged state and a non-privileged state. A machine instruction which imparts a significant influence to the system (e.g. I/O instruction or system interrupt mask change instruction) is called a privileged instruction and it can be used only in the privileged state. This is well known in the art.

FIG. 3 shows a memory hierarchy of the memory hierarchy of the virtual machine VM1 of FIG. 2. Numeral 2060 denotes a virtual space generated by the OS1 on the VM1. The OS1 exists on the main memory 2000-1 of the VM1. The main memory 2000-1 of the VM1 is copied on the main memory 2002 of the host system. (The main memory 2000 of the host system is divided into a hardware system area 2001 and a programmable area 2002 as shown in FIG. 7.). The copy is given by an address translation table 2010. FIG. 4a shows an address translation table 2010(1). The address translation table contains entries corresponding to addresses v2 on the main memory 2000-1 of the VM1 and corresponding addresses r on the main memory 2002. A start address of the address translation table 2010(1) is stored in one control register (Real Address Translation Table Origin Register (RATOR)) 1110 of basic control registers 1100 (see FIG. 7) in the CPU 1000 when the OS1 on the VM1 operates on the main memory 2000-1. In the present case, the address translation table 2010(1) exists on the main memory 2000-1 of the VM 10000-1, that is, on the main memory 2002 of the host system, and the start address is set in the register 1110 described by an address in the main memory 2002 of the host system.

Numeral 2060 in FIG. 3 denotes a virtual storage generated by the OS1 on the VM1 and a copy thereof to the main memory 2000-1 of the VM1 is given by an address translation table 2040 managed by the OS1. FIG. 4b shows a format of the address translation table. It contains entries corresponding to addresses v3 of the virtual storage 2060 and corresponding addresses v2 of the main memory 2000-1 of the VM1. A start address of the address translation table 2040 is stored in one control register (VATOR) 1120 of the basic control registers 1100 (see FIG. 7) of the CPU 1000 when the OS1 of the VM1 is running on the virtual storage 2060. In the present case, since the address translation table 2040 exists on the main memory 2000-1 of the OS1, the start address is described by an address system of the main memory 2000-1 of the OS1. The address translation table 2010(1) (called a translation table A) is managed and updated by the VMCP for the VM's, and the address translation table 2040 (called a translation table B) is managed and updated by the OS on each VM for its own virtual storage. The main memory 2002 of the host system is referred to as a level 1 memory, the main memory 2000-N (N=1, 2, 3, ...) of each VM is referred to as a level 2 memory, and the virtual storage 2060 generated by the OS on each VM (usually the OS generates a plurality of virtual storages) are collectively referred to as a level 3 memory. The virtual storage is usually divided into pages of a predetermined size (e.g. 4 KB) and mapped into the main memory for each page, and a certain number of continuous pages (e.g. 256 pages, 1 MB) are called one segment, as is well known in the art. Numeral 2020 in FIG. 3 denotes I/O operation command words (CCW) generated by the VMCP to start its own I/O operation. Since the VMCP operates on the level 1 memory, the CCW 2020 is generated at the level 1 memory address. It is called a level 1 CCW. The level 1 CCW need not be address-translated, and when an I/O start command is issued to the level 1 CCW, it is directly interpreted by the IOP 3000 and sent to the IOC 4000. The IOC 4000 executes each CCW for each I/O device. Numeral 2030 denotes a CCW prepared by the OS on the VM and is described by the level 2 memory address. The level 2 CCW is prepared by the OS on the VM. When an I/O start instruction is issued to the CCW from the OS on the VM, it may be translated to an equivalent level 1 CCW through the VMCP and the I/O start may be effected by the equivalent level 1 CCW through the VMCP. However, this leads to increase an overhead of the VMCP. Accordingly, in an alternative method, the VMCP intervenes to inform an address of the address translation table from the level 2 memory to the level 1 memory (translation table A) to the IOP 3000, and the IOP 3000, looking up the translation table 2010, translates the data address in the level 2 CCW (or level 2 memory address) to the level 1 memory address. In this method, the intervention of the VMCP is reduced and the overhead is reduced. The OS on the VM in many cases executes on the level 3 memory and hence the CCW generated by the OS on the VM in many cases exists on the level 3 memory. Numeral 2050 in FIG. 3 denotes a CCW described by the level 3 memory address, that is, a level 3 CCW. When the start I/O instruction is issued to the level 3 CCW by the OS on the VM, it informs an address of the address translation table from the level 3 memory to the level 2 memory (translation table B) and the address of the translation table from the level 2 memory to the level 1 memory (translation table A) to the IOP 3000 (FIG. 7), and the IOP 3000 looks up the translation table B to translate the data address of the level 3 CCW (level 3 memory address) to the level 2 memory address and looks up the translation table A to translate the translated level 2 memory address to the level 1 address in order to execute the CCW.

FIG. 4c shows an address translation buffer 3030 provided in a local storage in the IOP 3000 (FIG. 7) to reduce the address translation overhead in the IOP 3000. A field 1 of the address translation buffer 3030 contains VM numbers (VM #), a field 2 contains start addresses of the translation table A and the translation table B, a field 3 contains identification flags thereof, a field 4 contains CCW data addresses before translation and a field 5 contains level 1 memory addresses after translation. The IOP 3000 (FIG. 7) looks up the address translation buffer to translate the address, and if it is not found, looks up the translation table B and the translation table A to translate the address and register the translated address in the translation buffer 3030. The address translation buffer is a high speed local storage in the IOP 3000 and it is faster than the speed of looking up the translation tables B and A on the main memory 2002. It should be noted that the level 2 CCW, the level 3 CCW and the data buffers thereof should be fixed on the level 1 memory during the I/O execution. FIG. 5 illustrates a manner of dividing a continuous area of the main memory 2002 of the host system to use the divided sub-areas as the main memories for the respective VM's. When such VM's are used, a predetermined address displacement $\alpha$ is added to the address of the main memory of the VM to obtain the address of the main memory 2002 of the host system. In FIG. 5, the address displacement for the VM1 is $\alpha_1$ and the address displacement for the VM2 is $\alpha_2$. In this case, the address translation 2010 from the level 2 memory address to the level 1 memory address may be a mere table to manage lower limit addresses and upper limit addresses of the respective VM's, as shown by 2010(2). In this case, it is easy to address-translate the level 2 CCW and an entry of the address translation buffer 3030 for the level 2 CCW (entry of "0" field 3 of the address translation buffer 3030) is not necessary. Alternatively, as shown in FIG. 5, the translation table 2010(2) is read into the local storage in the IOP 3000 (FIG. 7), the address displacement $\alpha$ is obtained by the VM # and it is added to translate the address (translation from the level 2 memory address to the level 1 memory address). A high speed VM mode is provided for the VM in which the entire main memory of the VM (FIG. 3) is resident in the main memory 2002 of the host system and fixed therein or it occupies a continuous area of the main memory of the host system as shown in FIG. 5. In the high speed VM mode, most privileged instructions issued by the OS on the VM are directly executed (execution without the VMCP in the almost same performance as that of the host system). However, the I/O instruction on the VM requires the intervention by the VMCP as will be described later.

Referring to FIG. 6, a manner in which the start IO instruction issued by the OS on the VM is executed by the VMCP is explained. The OS on the VM designates a sub-channel number (sub-channel #) which corresponds to the I/O device to issue the start I/O instruction. Since this sub-channel $\pi$ is one under the VM, it is called a virtual sub-channel #. The VMCP translates it to a corresponding real sub-channel #. The correspondence is determined at the time of defining the VM. The VMCP checks the level of the CCW to which the start I/O instruction was issued by the OS on the VM. Usually, it is represented by an operand of the start I/O instruction. Let us assume that the start I/O instruction is issued to the level 3 CCW. In FIG. 6, the CCW 2810 is the CCW on the level 3 memory and the data address thereof is the level 3 memory address. The VMCP adds the operand 2800 to the CCW 2810 generated by the OS to issue the start I/O instruction. The operand 2800 contains a field L indicating the level of the CCW, and when L=3, the start address VATOR of the translation table B. A segment size SS thereof and a page size PS thereof. It also contains the start address PATOR of the translation table A, a segment size SS thereof, a page size PS thereof and an address to the CCW 2810. They are sent to the IOP 3000 (FIG. 7) through the line 200 upon the issuance of the start I/O instruction by the VMCP and basic information is set in the corresponding sub-channel register 3011. Similar basic information is stored in the corresponding sub-channel control block in the sub-channel control blocks 2090 shown in FIG. 7. (See sub-channel control block 2091 of FIG. 10). The IOP 3000 (FIG. 7) uses the address translation table in the sub-channel to execute the CCW 2810 generated by the OS while it translates the address.

FIG. 7 shows a hardware configuration in the prior art VMS and a block diagram concerning the I/O execution. A CPU 1000 includes a prefix register 1010 including an address of an area prefix (PSA) containing hardware interrupt information, CPU control registers 1100 and a program status word (PSW) 1020 containing a CPU basic status (such as an interrupt control bit or a machine instruction address to be executed next. It also includes an I/O instruction execute circuit 1030, an I/O interrupt circuit 1040, an I/O instruction execution microprogram 1050 and an I/O interrupt processing microprogram 1060. The V-bit representing a VM mode is present in 1090 as a VMS flag. During the rum of VM, this bit is set to "1" by the VMCP. The high speed VM mode flag H exists in 1090. The VMS control flag 1090 may be in other form. For example, a VMCP mode (hypervisor mode) and a VM mode may be provided and the VM mode may include the preferred or high performance VM mode and the non-preferred VM mode. They are more or less similar, as described above, the IOP 3000 executes the level 3 CCW or the level 2 CCW (see FIG. 3) while using the information of the address translation buffer 3030 (see FIG. 4C) under the control of the microprogram 3020 in accordance with the address translation information (FIG. 6) contained in the sub-channel control blocks 2090 and the sub-channel registers 3010. The main memory 2000 in FIG. 7 is divided into a hardware system area (HSA) 2001 and a programmable area 2002. The HSA 2001 contains hardware information to be used by the CPU 1000 and the IOP 3000 and it can be accessed and updated by the microprograms 1050, 1060 and 3020 of the CPU and the IOP but cannot be accessed by a machine instruction opened to a normal user of the CPU 1000. The programmable area 2002 can be accessed by the machine instruction and it is a main memory area as viewed from the OS or the VMCP. Those I/O instructions which accompany with the operation of the I/O device such as start I/O or stop I/O are queued in an I/O request queue 2070 in a form of request queue. It comprises control blocks 2071 containing I/O request real sub-channel numbers interconnected by address pointers. After queuing to the I/O request queue, a start signal is sent to the IOP 3000 through the line 200. The IOP 3000 accesses to the I/O request queue 2070 in the HSA 2001 and sequentially reads out request queue elements 2071 to process the I/O request. The I/O interrupt request is queued in the I/O interrupt request queue 2080 in the priority order of real interruption. A structure therefor is shown in FIG. 9. Eight interruption priority orders 0, 1, 2, 3, 4, 5, 6 and 7 are available and they are assigned by the operands together with the sub-channel numbers when the I/O instructions are issued. FIG. 10 shows a sub-channel control block 2091 in the sub-channel control blocks 2090 (FIG. 7). The sub-channel control blocks are arranged in the order of the real sub-channel numbers and their locations are uniquely determined by the real sub-channel numbers. The start address of the sub-channel control block 2090 is set in one control register in the control registers 1100 of the CPU 1000 (FIG. 7). The interruption priority order can be assigned to each sub-channel. Let us assume that the OS on the VM issues the I/O instruction while designating the sub-channel number and one of the interruption priority orders 0-7 Since the VM mode bit 1090 in FIG. 7 is "1", the I/O instruction executing $\mu p$(microprocessor) 1050 transfers the control to the VMCP. The control is transferred to the VMCP by a new PSW in the PSA 2100 of the VMCP as a kind of interruption. Since the address of the PSA of the VMCP has been set in the VMCP prefix register 1010 (FIG. 7) when the VM was started, it is referred.

The VMCP handles the sub-channel number designated by the OS on the VM as a virtual sub-channel number, translates it to a real sub-channel number, manages a real sub-channel status and if the real sub-channel is available, designates the address translation information 2800 shown in FIG. 6 and issues an I/O instruction in place of the OS on the VM.

The interruption priority order designated by the OS on the VM is the virtual interruption priority order. The VMCP issues the I/O instruction while using the virtual interruption priority order as the real interruption priority order. Accordingly, the real interruption priority order is shared by the OS's on the VM's. Accordingly, the I/O interrupt requests from the sub-channels of the OS's on the VM's are mixedly queued in the real interruption priority order queue of the I/O interrupt request queue 2080 of FIG. 9.

The reasons for intervention by the VMCP to the execution of the I/O instruction from the OS on the VM are as follows.
(i) The virtual sub-channel number designated by the OS on the VM must be translated into the real sub-channel number.
(ii) Since the real sub-channel may be shared by the OS's on the VM's, sub-channel scheduling therefor is required.

FIG. 11 shows a manner to control the I/O interruption. The I/O interrupt request from the sub-channel is detected by the IOP 3000 and the corresponding sub-channel control block is queued in the I/O interrupt request queue 2080 (see FIG. 7). A structure of the I/O interrupt request queue is shown in FIG. 9, and the sub-channel control blocks are queued in the order of the real interruption priority. A bit of a corresponding real interruption pending register 1042 shown in FIG. 11 is set to "1". When the bit of the interruption pending register 1042 and the bit of the corresponding real interruption priority order mask register 1041 are both "1" and an I/O mask of the PSW 1020 is "1", the I/O interruption is initiated for the corresponding real interruption priority order and the control is transferred to the I/O interrupt processing microprogram 1060. The above operation in carried out by a hardware circuit shown in FIG. 11.

In the VMS, the real interruption priority order is shared by the OS's on the VM's as described above. Accordingly, during the running of the VM, the bits of the real interruption priority order mask register 1041 are set to the OR function of the interruption priority order masks of the OS's on the VM's or to "1" so that the interruption is always accepted. The I/O mask of the PSW 1020 is also set to "1". Consequently, if a bit of the real interruption pending register 1042 is changed to "1" by the I/O interrupt request from the sub-channel, an output of one of AND gates 1046 is rendered to "1", an output of an OR gate 1043 is rendered to "1" and an output of an AND gate 1044 is rendered to "1" so that the I/O interrupt processing microprogram 1060 is immediately started by the I/O interrupt circuit shown in FIG. 11. The I/O interrupt processing microprogram 1060 dequeues the sub-channel queued in the corresponding highest interruption priority order I/O interrupt request queue (FIG. 9) to reflect the interruption to the prefix of the VMCP. If the interrupt request queue of the real interruption priority order is vacant, the bit of the real interruption priority order real interruption pending register 1042 is set to "0". As a result, the interruption pending is cleared. By the reflection of the interruption to the VMCP, the control is transferred to the I/O interrupt processing program of the VMCP. The real sub-channel number which requested the I/O interruption as the I/O interrupt parameter and the corresponding VM number are also transferred to the VMCP. The VMCP carries out the following processing to reflect the I/O interruption to the VM.

(i) Translates the real sub-channel number to the virtual sub-channel number.
(ii) Checks the interruption priority mask register of the VM and the I/O mask of the PSW to determine if the I/O interruption is acceptable.
(iii) If the VM accepts the interruption, reflects the interruption to the prefix PSA of the VM.
(iv) If the VM does not accept the interruption, the interruption is made pending by the VMCP.

Since the real interruption priority order is shared by the VM's, the mask must be set to an OR function (usually "1") of the corresponding masks of the VM's. As a result, the VMCP may be interrupted even for the non-interruptable order in the VM. In such a case, the I/O interruption is made pending by the VMCP. Accordingly, simulation by the intervention of the VMCP is required for the I/O instruction to the subchannel.

As described above, in the I/O execution of the OS on the VM in the prior art virtual machine system, the function of the IOP for directly executing the level 3 CCW and the level 2 CCW exists but the VMCP always intervenes and the simulation is required. Accordingly, a simulation overhead of the VMCP increases for a load having a high I/O issuance frequency.

SUMMARY OF THE INVENTION

It is an object of the present invention to reduce a simulation overhead of an I/O instruction and the I/O interruption of the OS on the VM by VMCP and support direct execution of the I/O instruction on the VM and the I/O interruption by hardware and microprogram.

In accordance with the present invention, in a system having a virtual machine system (VMS) in which at least one operating system can be simultaneously run under one real computer system (host system) and a control program (VMCP) for controlling the VMS, whether an I/O device of the host system is dedicated to or occupied by an OS or not in accordance with information stored in the real computer system is determined, and if the I/O device designated by an I/O instruction other than an I/O state instruction issued by the OS is dedicated to the OS which is currently run, the I/O instruction is issued to that I/O device, and if it is not dedicated to the OS which is currently running, the VMCP is interrupted.

BRIEF DESCRIPTION OF THE DRAWINGS

FIG. 3 shows a memory hierachy in a prior art virtual machine (VM);
FIGS. 4–11 show prior art examples in which;
FIGS. 4A to 4C show address translation tables;
FIG. 5 shows a configuration of a VM which occupies a continuous area of a real main memory;
FIG. 6 shows an I/O instruction issued by a VMCP for I/O simulation of the VM;
FIG. 7 shows a configuration of a host system;
FIG. 8 shows an I/O request queue;
FIG. 9 shows an I/O interrupt request queue;
FIG. 10 shows real subchannel control blocks;
FIG. 11 shows an I/O interrupt circuit;
FIGS. 12 to 22 relate to the present invention in which:
FIG. 12 shows a configuration of a host system;
FIG. 13 shows a prefix control table;
FIG. 14 shows a translation table address control table;
FIG. 15 shows a VM control table;
FIG. 16 shows real subchannel control blocks;
FIG. 17 shows a start VM instruction;
FIG. 18 shows VMS control registers;
FIG. 19 shows VMS control flags;
FIG. 21 shows a VMS interrupt control register;
FIG. 22 shows a VMS I/O interrupt circuit;
FIG. 28 is a view for illustrating, by way of example, queuing of I/O requests;
FIG. 29 is a view showing a logical resource control table provided in an input/output control unit;
FIG. 30 shows a structure of a channel path group control table incorporated in the input/output control unit;
FIG. 31 shows an example of queuing I/O interruption requests;
FIG. 32 is a view showing a format of an extended start subchannel instruction.

DESCRIPTION OF THE PREFERRED EMBODIMENTS

Figure 12:
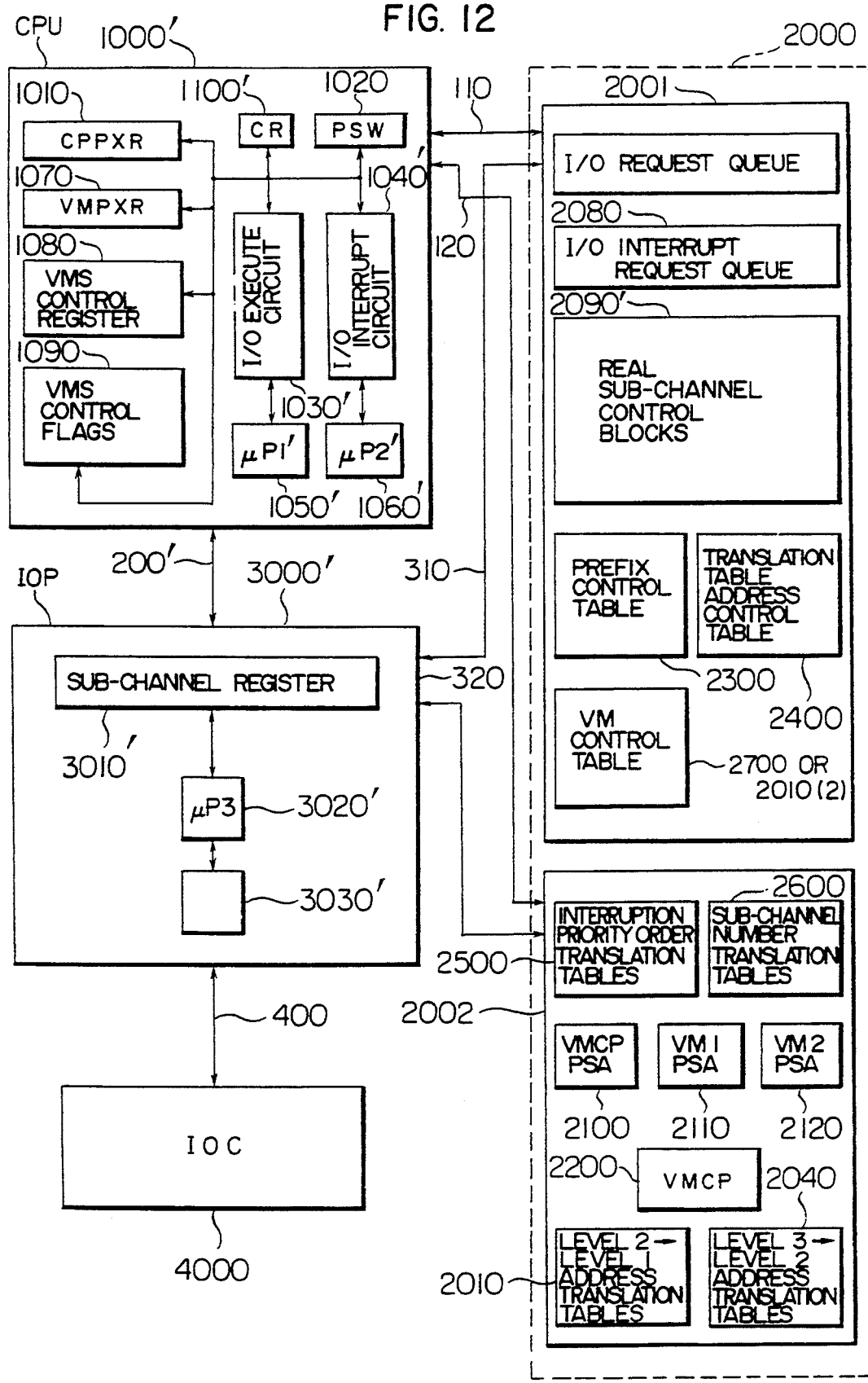

FIG. 12 shows an overall configuration of one embodiment of the present invention.

Figure 1:
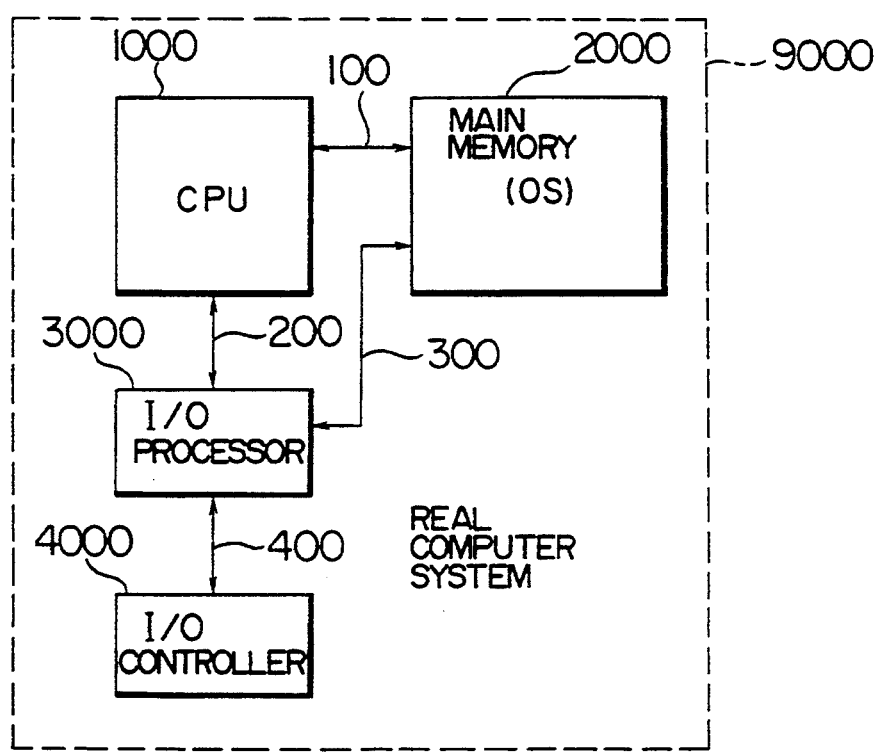
FIG. 1 is a block diagram of a real computer system by a conventional OS.
Figure 2:
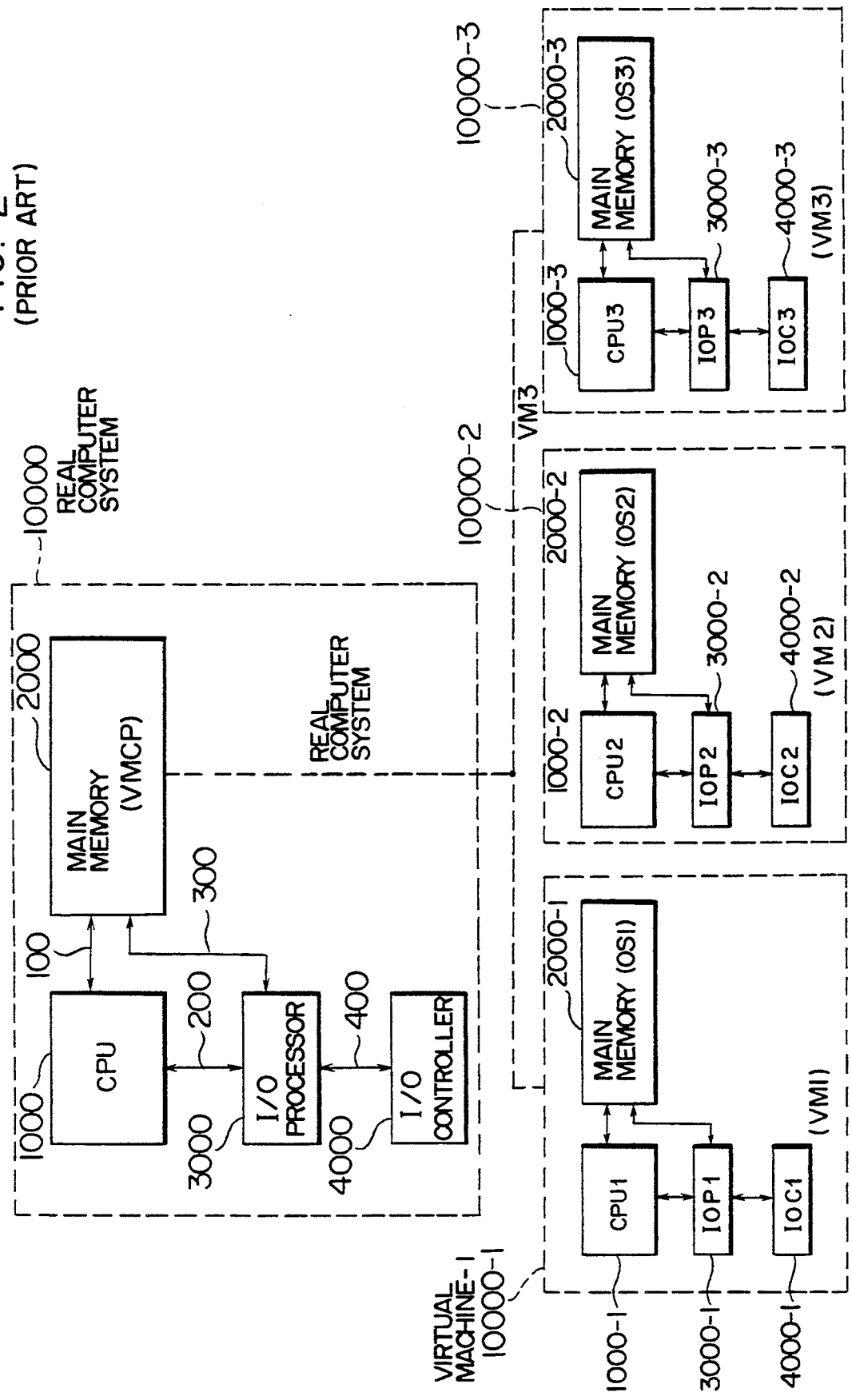
FIG. 2 is a block diagram of a prior art virtual machine system (VMS)
Figure 6:
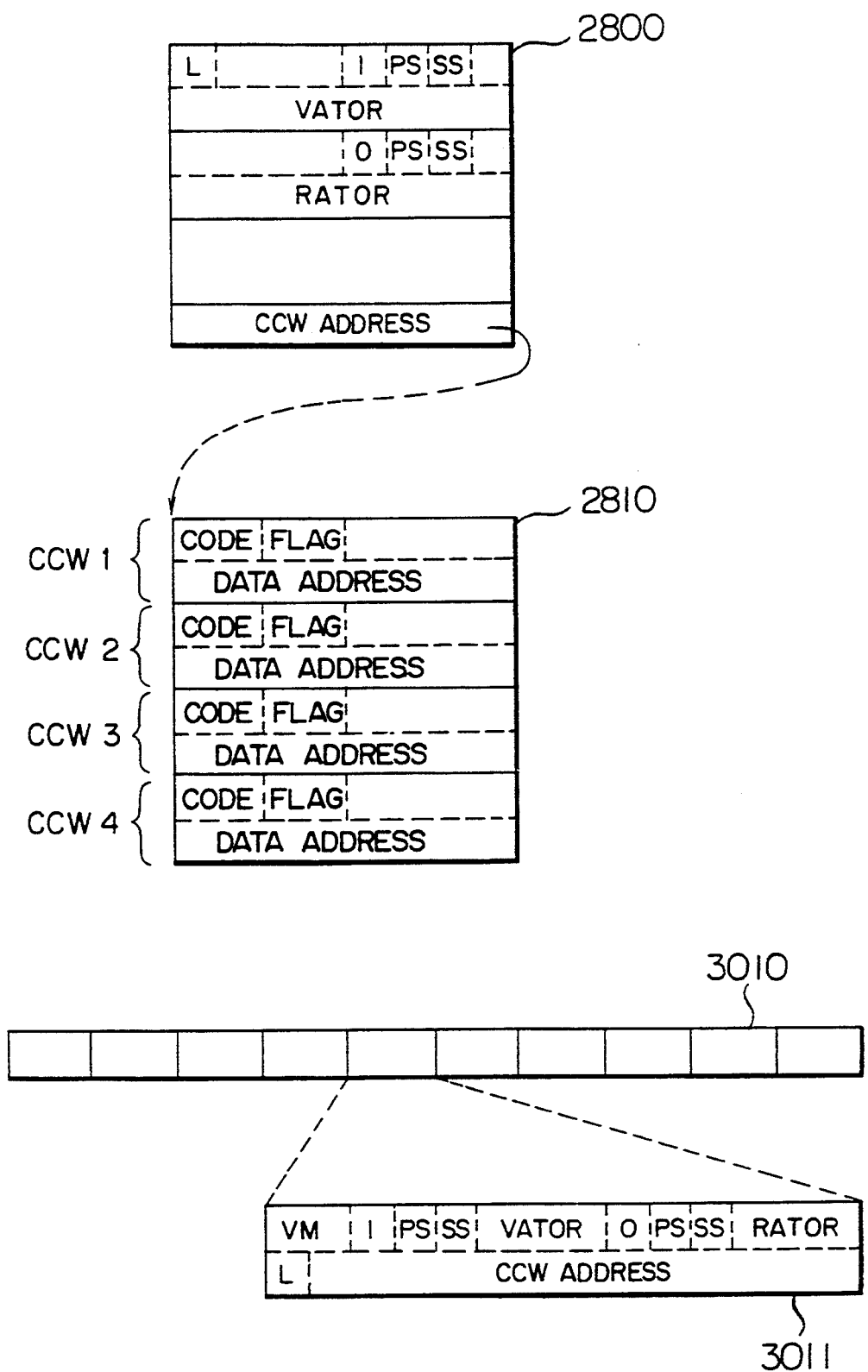
Figure 7:
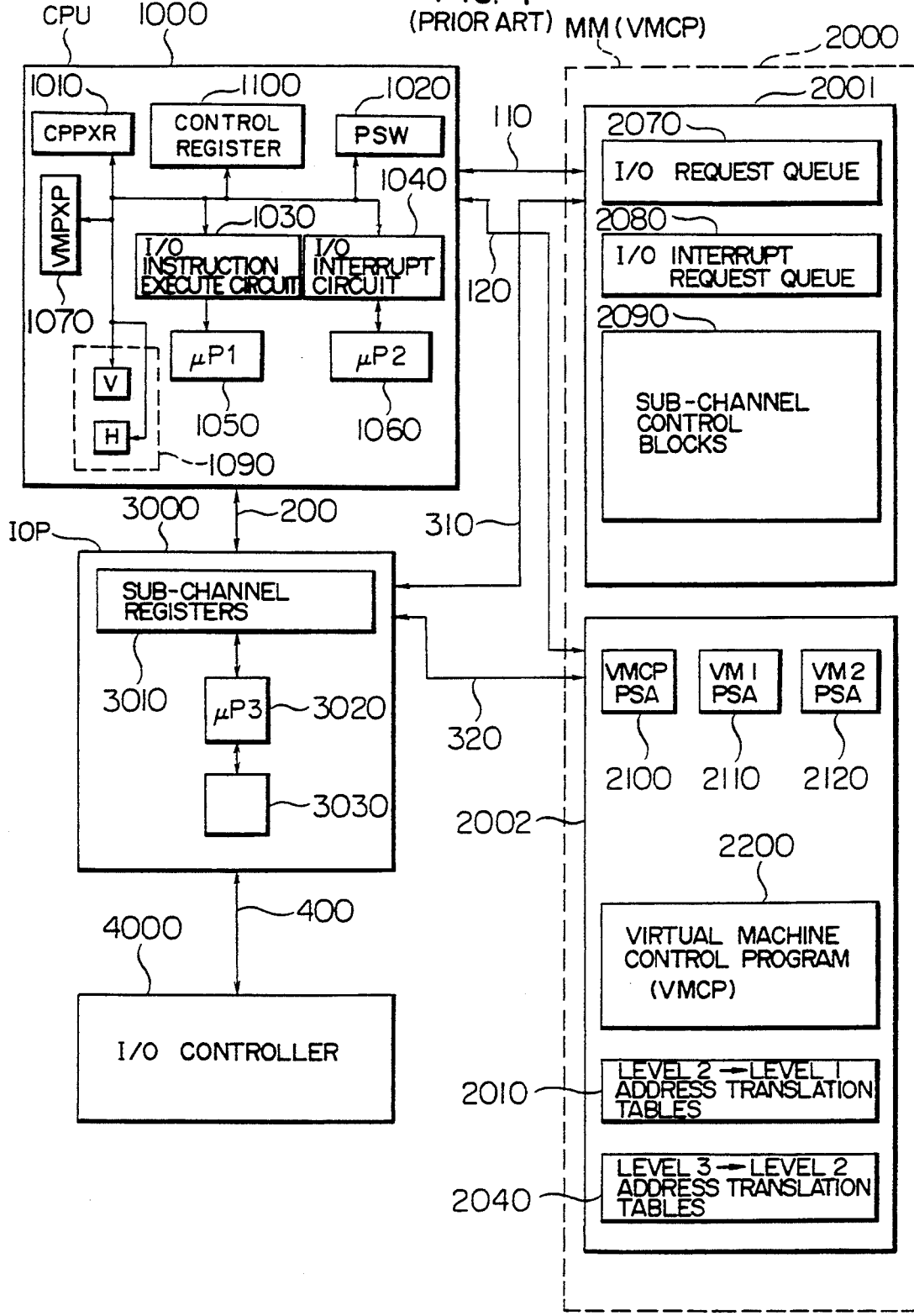

Elements of a CPU 1000' are similar to those of FIG. 7 but some of them are expanded in function. An HSA 2001 includes the same elements as those in FIG. 7. (I/O request queue 2070, I/O interrupt request queue 2080 and real subchannel control blocks 2090'.). However, a prefix control table 2300, a translation table address control table 2400 and a VM control table 2700 include new information.

A programmable area 2002 includes the same elements as those of FIG. 7 (VMCP PSA 2100, VM1 PSA 2110, VM2 PSA 2120, (PSA's of other VM's), VMCP 2200, level 2 memory to level 1 memory address translation tables 2010 and level 3 memory to level 2 memory address translation tables 2040). However, an interruption priority order number translation table 2500 and sub-channel number translation tables 2600 include new information. An IOP 3000' is similar to the IOP 3000 in FIG. 7 in configuration but expanded in function. The new information included in the HSA 2001 and the programmable area 2002 is new explained.

Figure 13:
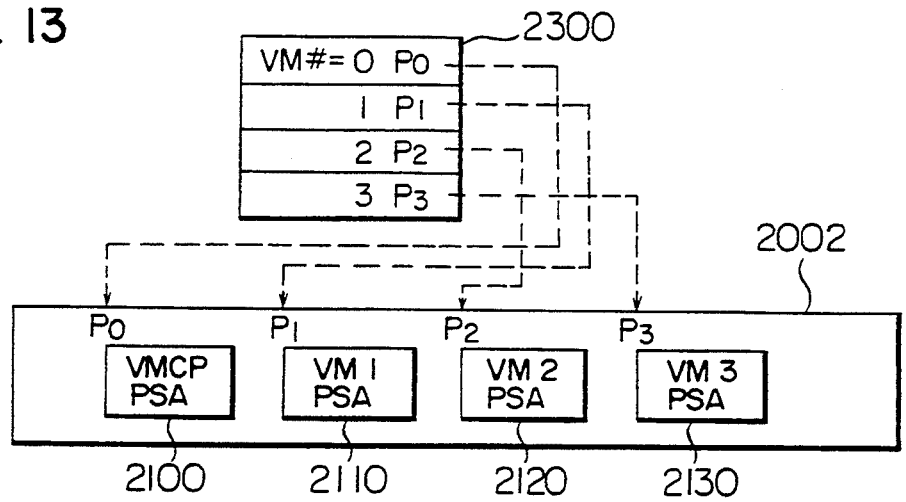
Figure 14:
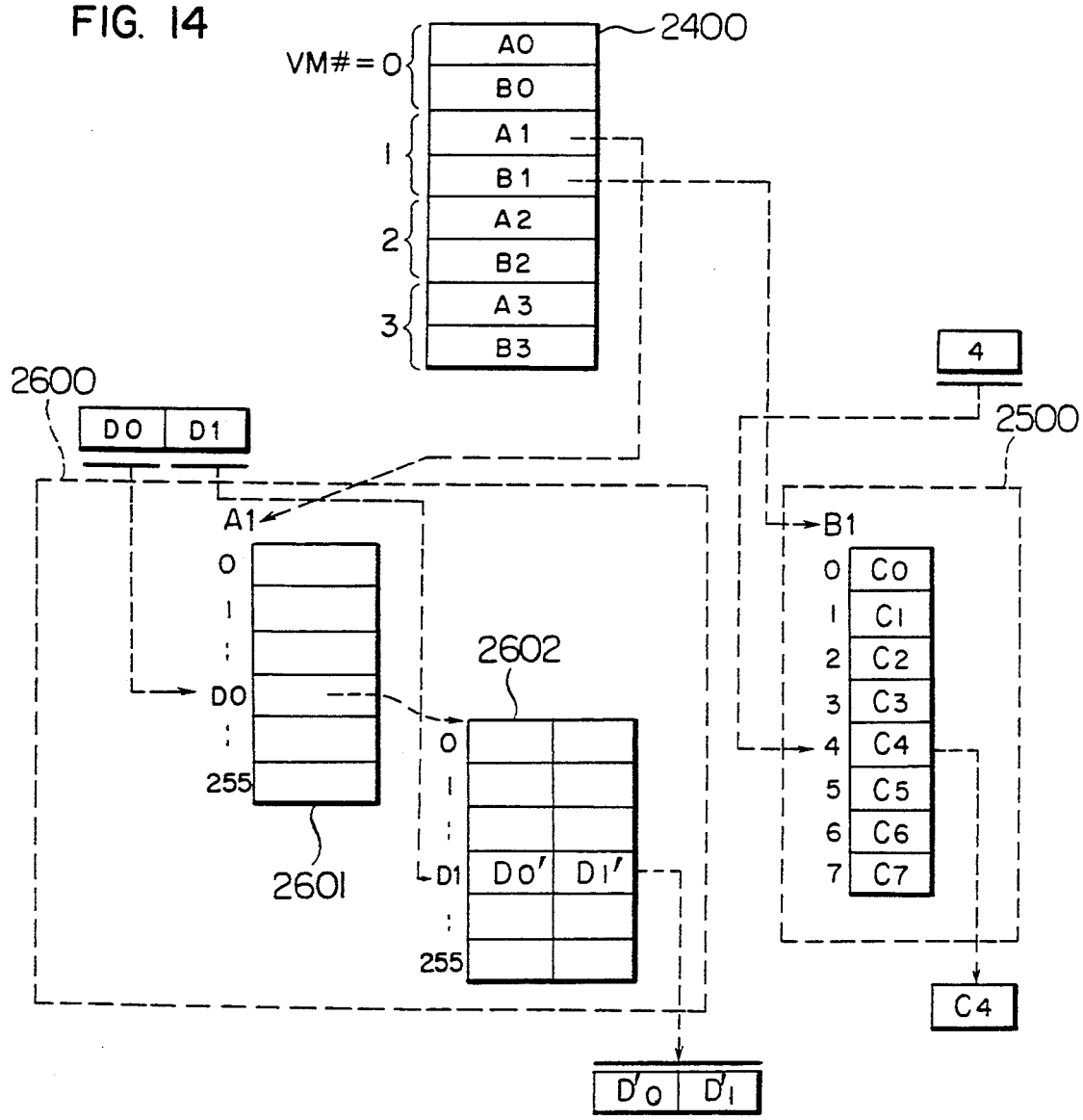

FIG. 13 shows the prefix control table 2300. It includes the VMCP PSA address, VM1 PSA address, VM2 PSA address and VM3 PSA address. While not shown in FIG. 13, other VM PSA's may be registered. The PSA addresses are referred by a microprogram of the CPU 1000' and they are addresses in a host system of the programmable area 2002. The VM PSA address is imparted as one of start instruction operands when the VM is started and it is stored in the corresponding entry of the prefix control table 2300 when the instruction is executed. A start address of the prefix control table 2300 is stored in one of the control registers 1100' of the CPU 1000' (see FIG. 12). The prefix control table is optional and not essential. A case where it is used will be explained later. FIG. 14 shows the translation table address control table 2400. It controls a start address of the sub-channel number translation table 2600 and a start address of the interruption priority order translation table 2500, for each VM. A start address of the translation table address control table 2400 is also stored in one of the control registers 1100' of the CPU 1000'. A method of looking up the sub-channel number translation table 2600 and the interruption priority order translation table 2500 is shown in FIG. 14. A virtual sub-channel number (two bytes) is divided into D0.256 and D1, and a first half table 2601 pointed by the content of the corresponding entry of the address control table 2400 is looked up by D0. An address of a second half table 2602 is contained in the D0-th entry of the first half table 2601 so that a D1-th entry of the second half table 2602 is looked up. In this manner, the corresponding real sub-channel number D0'.256+D1' is obtained. The virtual interruption priority order is translated to the corresponding real interruption order by merely reading the corresponding entry of the translation table 2500. The sub-channel number translation table 2600 and the interruption priority order translation table 2500 are prepared by the VMCP when they are designated by the VMCP command or when the VM is defined from the VM defining information, and designated by the start instruction operand when the VM is started, and stored in the corresponding entry of the translation table address control table 2400 when the start instruction is executed. The translation tables 2600, 2500 and 2400 are optional and not essential. Those translation tables are not necessary so long as the VM which uses the I/O execution system of the present invention in the VMS obeys a rule of virtual sub-channel number being equal to a real sub-channel number, and virtual interruption priority order being equal to real interruption priority order.

Figure 15:
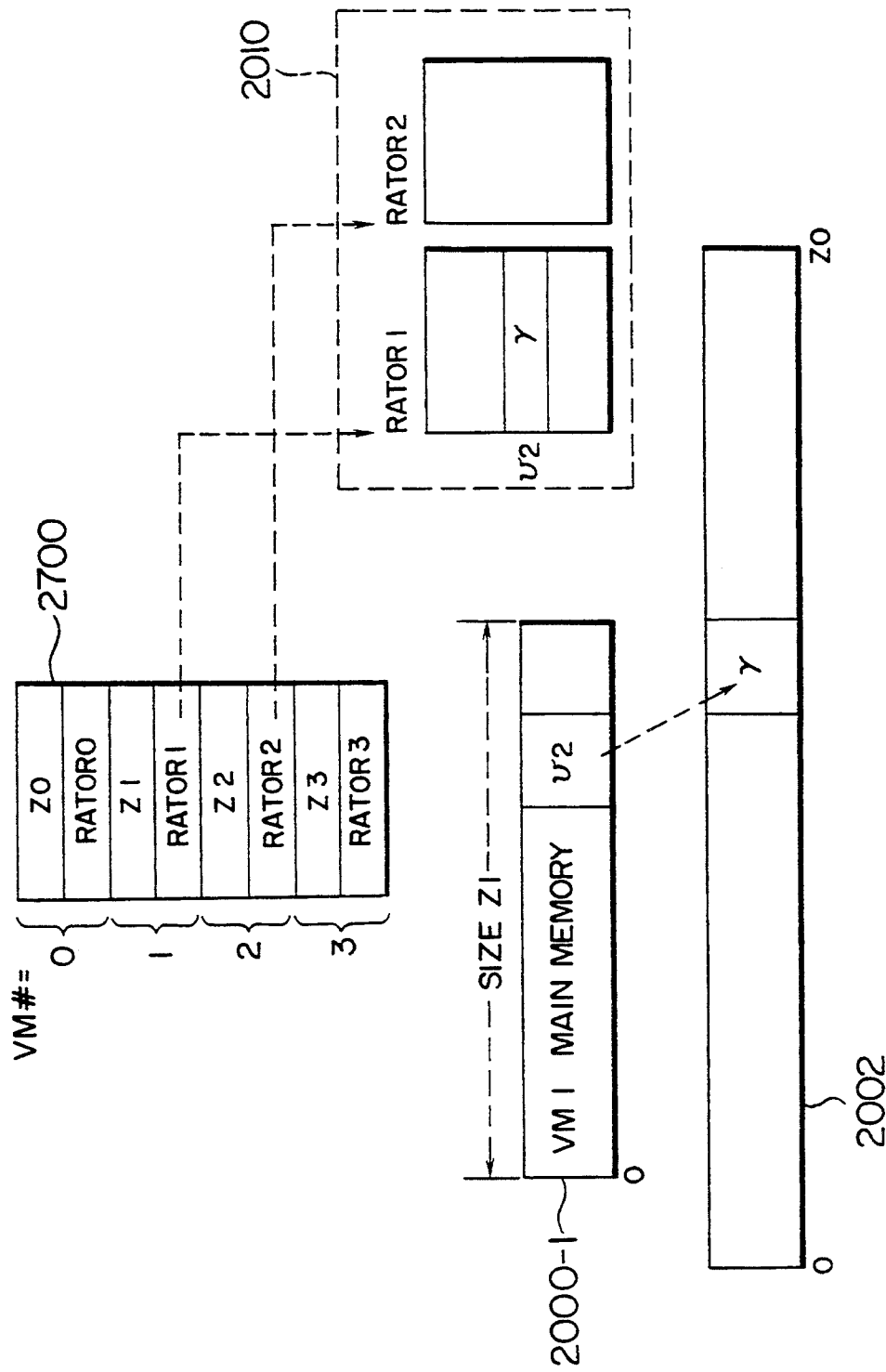
Figure 16:
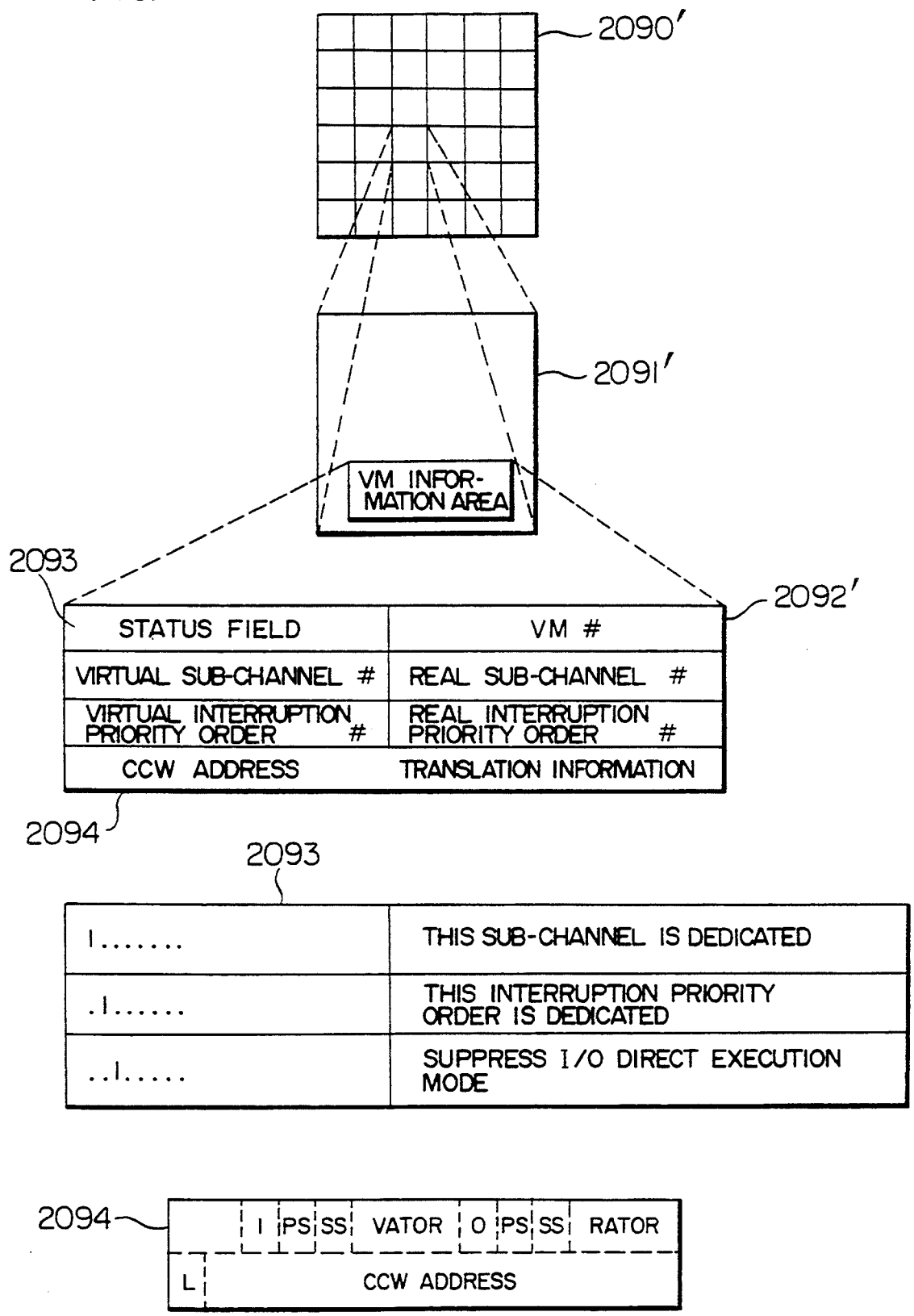

FIG. 15 shows a content of the VM control table 2700. It contains sizes (Z0, Z1, ...) of the main memories of the corresponding VM's, and address (RATOR0, RATOR1, ...) of the level 2 memory address to level 1 memory address translation table 2010. Such information is derived from the VM definition information and stored in the corresponding entry of the VM control table 2700 in the HSA 2001 by the start VM instruction. A start address of the VM control table 2700 is stored in one of the control registers 1100' (see FIG. 12) in the CPU 1000'. A start address of the control block in the HSA 2001 is stored in the control register 1100' in the CPU 1000' as is done in the prior art system. When the VM which supports the I/O execution system of the present invention is limited to one which occupies the continuous area on the main memory 2002 (FIG. 5) as a main memory therefor, the VM control table 2700 may be substituted by a translation table 2010(2) which defines upper and lower limits. When the translation table 2010(2) shown in FIG. 5 is used, the upper and lower limit addresses $a_i$ and $a_{i+1}$ ($i=1, 2, 3, ...$) are designated by the VM start instruction, and the corresponding entry of the translation table 2010 (2) is set in the HSA 2001 as the instruction is executed. FIG. 16 shows the real sub-channel control blocks 2090', one real sub-channel control block 2091' thereof and a VM information area 2092' thereof. The VM information area 2092' includes status field, VM number, virtual sub-channel number, corresponding real sub-channel number, virtual interruption priority order, corresponding real interruption priority order and CCW address translation information 2094. The status field includes flags indicating whether the sub-channel is occupied or not and whether the sub-channel is in an I/O direct execution suppress mode or not. The CCW address translation information 2094 has the same content as the address translation information 2092 of FIG. 10. The information in the VM information area 2092' is set from the VM definition information when the VM is defined, or when it is designated by the VMCP command, or when the I/O instruction is executed.

The dedication of the real sub-channel or the dedication of the real interruption priority order is designated when the VM is defined or by the VMCP command. When it is designated, the following fields in the VM information area 2092' are set.

A sub-channel dedication flag in the status field 2093
The I/O direct execution mode suppress flag is normally set to "0" and the I/O direct execution mode is set to a support state.
Dedicating VM number Virtual sub-channel number and real sub-channel number
Start address (RATOR, see FIG. 4a) of the dedicating VM main memory (level 2 memory) to level 1 memory address translation table, in the CCW address translation information 2094. If the dedicating VM occupies the main memory shown in FIG. 5, the upper and lower limits thereof $a_i$ and $a_{i+1}$ ($i=1, 2, 3, ...$) may be set.

In the shared sub-channel, such information is set as required when the I/O instruction is executed. In this case, it is set in the corresponding field on the VM information area of the I/O issuing VM.

Figure 17:
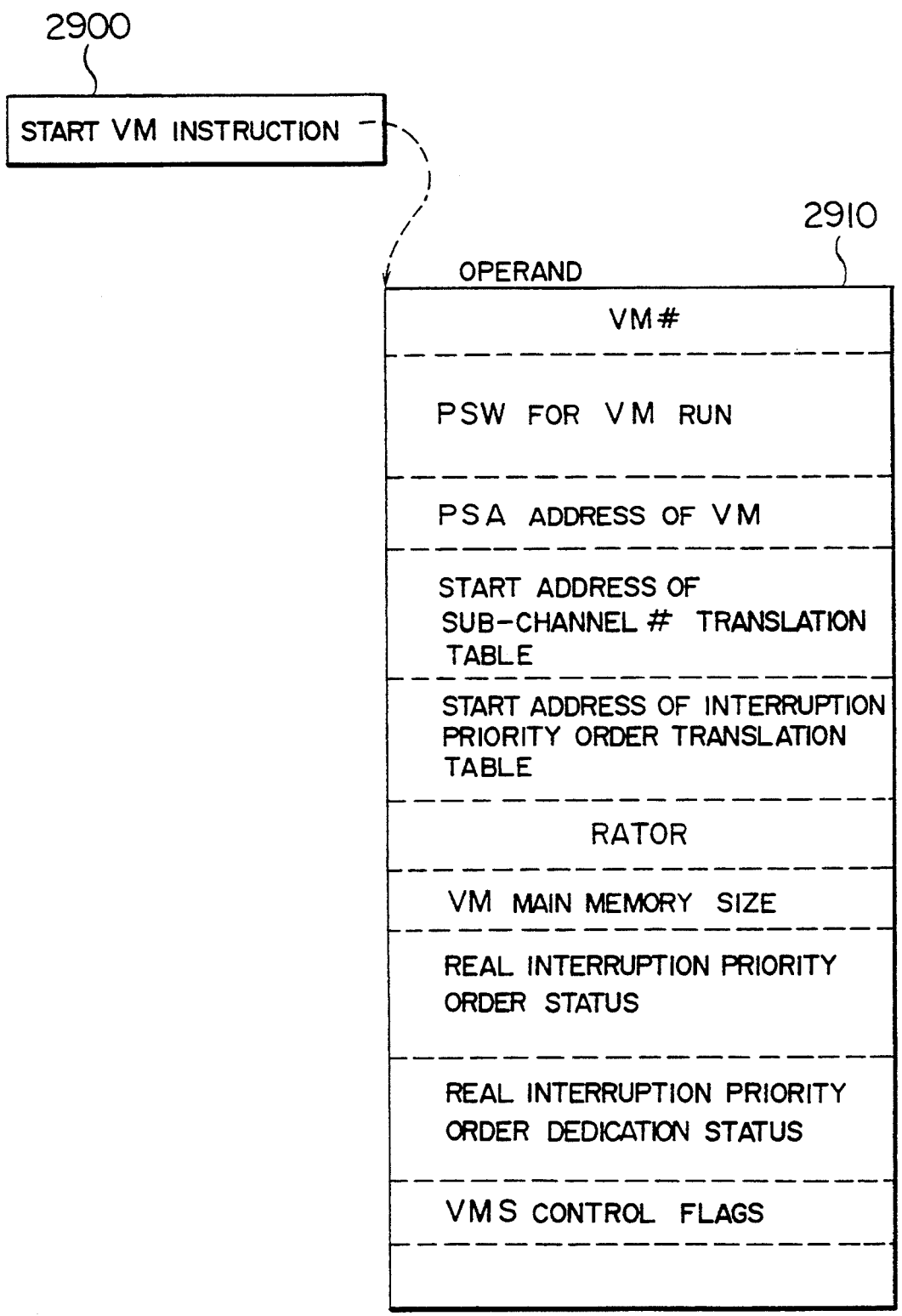
Figure 18:
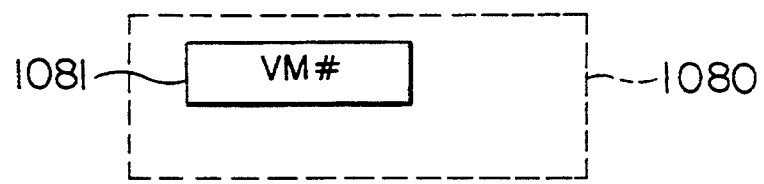
Figure 19:
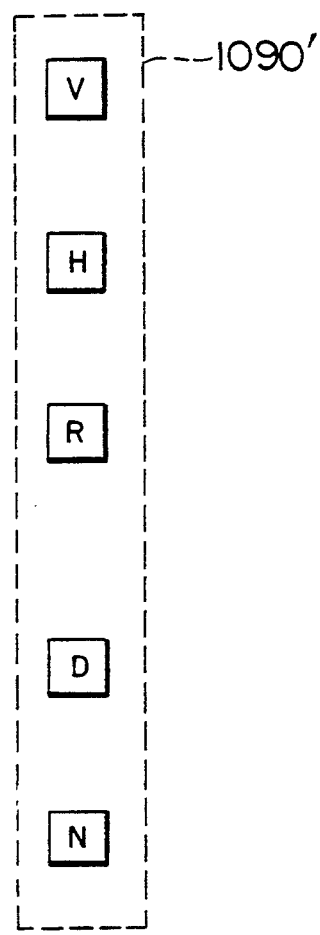

FIG. 17 shows a format of the start VM instruction. Numeral 2900 denotes the start VM instruction and numeral denotes an operand. The operand 2910 contains VM number, VM PSW, VM PSA address, start address of the sub-channel number translation table 2600 (FIG. 14), start address of the interruption priority order translation table (FIG. 14), start address RATOR (see FIG. 4a) of the VM main memory to host system main memory address translation table 2010 (FIG. 15) and VM main memory size. (For the latter two, when the VM to be started uses the continuous area of the main memory 2002 shown in FIG. 5 as the VM main memory, the upper and lower limits $a_i$ and $a_{i+1}$ (i=1, 2, 3, ...) may be designated. Of those operand information, the VM run PSW, VM PSA address, real interruption priority order status and VMS control flags are determined when the VM is started, and many other information are determined by the VM definition information when the VM is defined. The real interruption priority order status real interruption priority order dedication status and VMS control flags will be explained later. Those operands are set by the VMCP. The start VM instruction is not necessarily of the format shown in FIG. 17, although the information shown in FIG. 17 is needed as the operands. FIG. 18 shows a VMS control registers 1080. A register 1081 contains a VM number of currently running VM and is set by the start VM instruction. The content of the register is given by a content of one field of the operand 2910 (FIG. 17) of the start VM instruction. FIG. 19 shows the VMS control flags 1090' (see FIG. 12). The flags are initialized by one field of the operand of the VM start instruction (FIG. 17). The flags have the following meanings, respectively.

V: It is "1" during the VM run. It is "0" during the VMCP run or in the real computer mode. It is set to "1" by the start VM instruction and set to "0" when the control is transferred to the VMCP by the interruption. It is similar to the prior art system (FIG. 7).

H: It is set to "1" when a privileged instruction may be directly executed during the VM run. When this flag is "1", most privileged instructions in the VM run are directly executed by the instruction execute circuit of the CPU 1000'. When H is "1", it is a high speed VM mode, similarly to the prior art system (FIG. 7).

R: It is set to "1" when the OS on the VM is limited such that virtual sub-channel number is equal to real sub-channel number, and virtual interruption priority order is equal to real interruption priority order When this flag is "1" the sub-channel number translation and the interruption priority order translation by the microprogram are eliminated. (In this case, the translation tables 2400, 2600 and 2500 shown in FIG. 14 are not necessary.)

D: It is "1" when the direct I/O execution by the VM (without the intervention of VMCP) in accordance with the present invention is enabled. It is initially set to "1" by the start VM instruction of the VMCP.

N: It is set to "1" when the currently running VM has an interruption pending factor on a shared interruption priority order (which is actually made pending by the VMCP for the VM) and interruptable in relation to the virtual interruption priority order mask of the currently running VM (according, not interruptable, because the I/O mask of the PSW of the VM is "0".). It is used when an instruction for checking the I/O interrupt request of the VM acceptable for in relation to the virtual interruption priority order is executed. It is initialized by the VMCP by the start VM instruction.

Figures 20A, 20B:
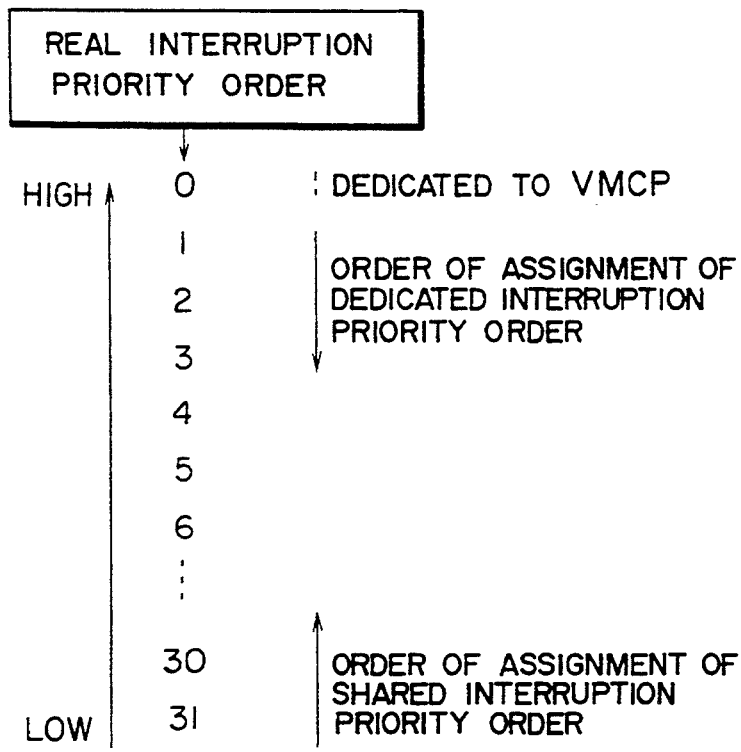
FIGS. 20A and 20B illustrate a manner of assigning an interruption priority order.

FIGS. 20a and 20b show a method of assigning the real interruption priority orders. 32 real interruption priority orders 0–31 are used. The real interruption priority order 0 is the highest priority order and exclusively used by the VMCP. The real interruption priority orders dedicated to the VM's are assigned to the dedicating VM's in the ascending order starting from the real interruption priority order 1 (descending order in the interruption priority order). The shared interruption priority orders are assigned to the VM's in the descending order starting from the real interruption priority order 31 (ascending order in the interruption priority order). In FIGS. 20a and 20b, the real interruption priority order 1 is assigned to the virtual interruption priority order 0 of the VM1 and it is exclusively used, and the real interruption priority order 31 is assigned to the virtual interruption priority orders 1–7 and it is shared by the VM's. For the VM2 and VM3, the assignment is done as shown in FIGS. 20a and 20b. The virtual interruption priority order in the VM1 is actually 0 or (1–7). Accordingly, there are two real interruption priority orders which can be effectively used by the OS on the VM1. The restriction to the OS can be permitted by operation. The particular interruption priority order to be exclusively dedicated to the VM should be determined under an overall plan of the VMS and controlled by the VMCP. The exclusive 1 shared status of the real interruption priority order thus determined is given by the operand of the start VM instruction (see FIG. 17) and set into the real interruption priority order exclusive status register 1049 (FIG. 21) when the instruction is executed.

FIG. 21 shows the real interruption priority order mask register 1041', real interruption pending register 1042', real interruption priority order status register 1045 and real interruption priority order dedication status register 1049. Those are all included in the I/O interrupt circuit 1040' of FIG. 12. The registers 1041' and 1042' are similar to those in the prior art system but have increased number of bits. In FIG. 21, they have 32 bits which are four times as large as 8 bits in the prior art system, in order to support the dedication system of the real interruption priority order in the VM. The explanation thereof is omitted because the meaning is same. The meaning of the real interruption priority order status register 1045 is described below. It means that when the bit n (0–31) is "0" the real interruption priority order n is dedicated to the currently running VM. In other case, it is set to "1". A content of the real interruption priority order dedication status register 1049 is described below. When a bit c (0–31) is "0", it means that the real interruption priority order c is dedicated to a VM, and when the bit c is "1", it means that the real interruption priority order c is shared. The registers 1045 and 1049 are initialized by the operand of the start VM instruction. The real interruption priority order mask register 1041' is controlled and updated by the VMCP. The real interruption pending register 1042' is set by the IOP 3000' (FIG. 12) and reset by the I/O interrupt processing microprogram 1060' (FIG. 22).

Figure 22:
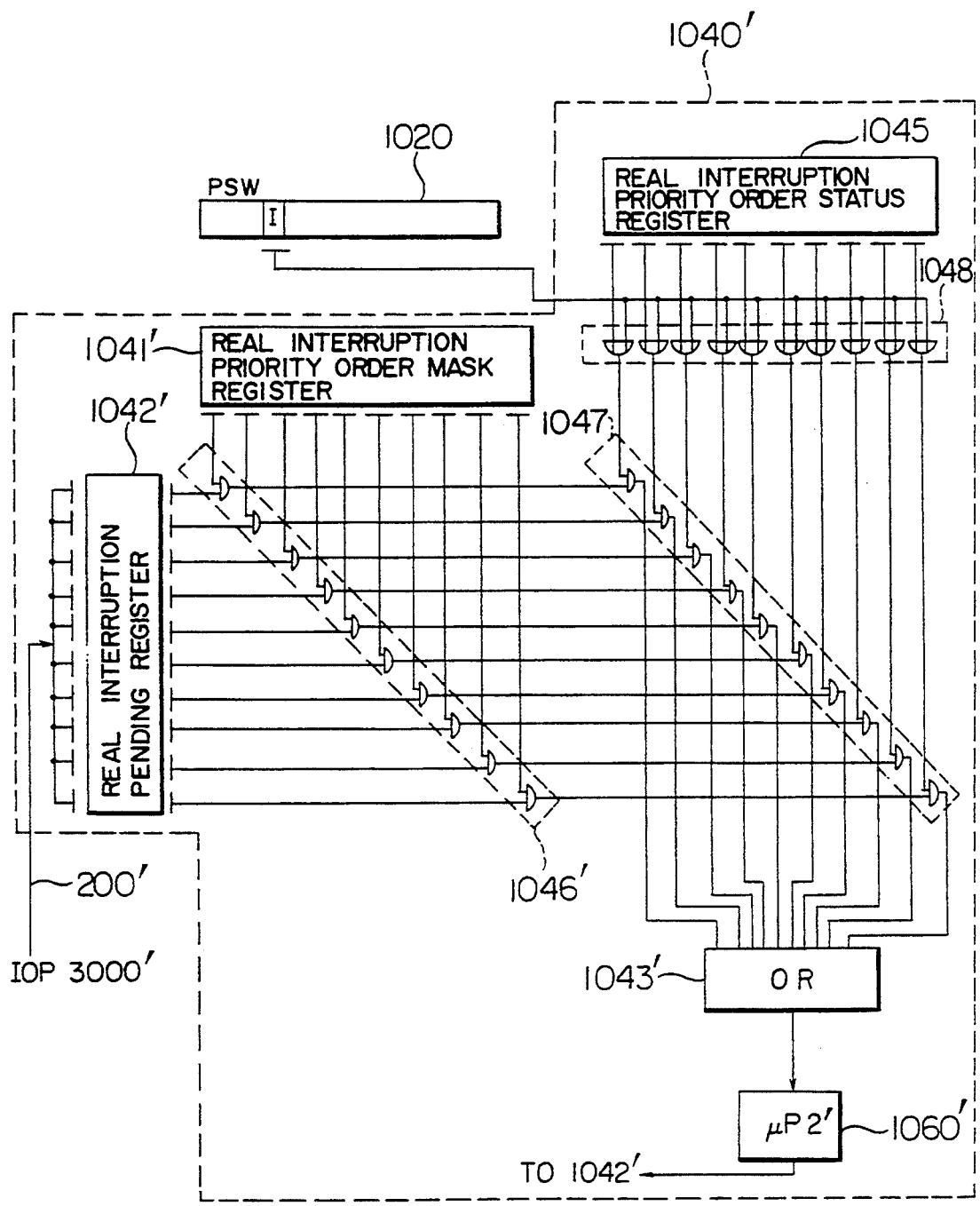

FIG. 22 is a circuit diagram of the I/O interrupt circuit 1040' of the present invention. For the sake of simplicity, only ten real interruption priority orders are shown in FIG. 22 but there are actually 32 orders connected in a similar manner. Let us assume that the real interruption priority order c (c=0-31) has an interruption pending factor (that is, the sub-channel having the interrupt request is queued to the real interruption priority order (c) level queue of the I/O interrupt request queue 2080 and the corresponding bit of the pending register 1042' is rendered to "1"). If the interruption priority order c is dedicated to the currently running VM, the corresponding bit of the real interruption priority order status register 1045 is zero, and the OR gate 1048 outputs the content of the I/O mask of the PSW so that the I/O interrupt mask of the PSW 1020 is effective. Accordingly, only when the corresponding bit of the corresponding real interruption priority order mask register 1041' is "1" and the I/O mask of the PSW is "1" the corresponding output of the AND gate 1047 is "1", the I/O interruption is started and the control is transferred to the I/O interrupt processing microprogram 1060'. When the interruption priority order c is shared or dedicated to other VM, the corresponding bit of the register 1045 is "1", the corresponding output of the OR gate 1048 is "1" and the I/O mask of the PSW 1020 is ignored so that the I/O interruption is started if the bit of the corresponding real interruption priority order mask register 1041'is "1". After the processing of the interruption by the microprogram 1060', if the interrupt request queue of the interruption priority order c is vacant, the corresponding bit of the pending register 1042' is cleared to "0" by the microprogram.

The manner in which the I/O instruction of the OS on the VM and the I/O interruption are executed and processed by the hardware, microprogram and information on the main memory is now explained.

The following presumptions are made and the VM is in the high speed VM mode.

(i) The entire main memory of the VM is resident in the main memory of the host system.

(ii) The direct I/O execution of the OS on the VM (without the intervention of the VMCP, including the direct execution of the I/O interrupt) is supported only for the dedicating sub-channel and the sub-channel having the dedication interruption priority order.

When the VM is started, the VMCP sets the operand of the start VM instruction of FIG. 17 and the bit c of the real interruption priority order mask register 1041' in a manner shown below.

When the real interruption priority order c (0-31) is dedicated to the currently running VM, the mask of the virtual interruption priority order (only one is assumed for the sake of simplicity) of the OS on the corresponding VM is set to bit c.

When the interruption priority order c is dedicated to other VM, an AND function of the mask of the corresponding virtual interruption priority order of the VM and the I/O mask of the PSW of the VM is set to the bit c. Alternatively, the bit c may be set to "0" if the delay of the interruption of the interruption priority order c does not cause a problem.

When the interruption priority order c is shared by the VM's, the bit c is set to "1".

When the virtual interruption priority order mask is changed during the VM run, the change is immediately reflected to the real interruption priority order mask register 1041' (FIG. 21). Accordingly, the instruction to change the virtual interruption priority order mask of the OS may be simulated via the VMCP or the change may be reflected to the register 1041' by the microprogram processing of the CPU, as is done in the prior art system. When the VM in the high speed VM mode is started, the PSW of the VM is set in the VM run PSW of the operand of the start VM instruction of FIG. 17 and it is set in the PSW 1020 (FIG. 12) of the CPU 1000'. Accordingly, the I/O mask of the PSW coincides with the I/O mask of the running VM. The coincidence is attained because the change of the PSW of the OS during the VM run is immediately reflected to the PSW 1020. The instruction to change the PSW of the OS may be reflected to the PSW 1020 of the CPU 1000' by the direct execution or may be reflected by the simulation via the VMCP. After those settings, the control is transferred to the OS on the VM by the start VM instruction (FIG. 17). As the instruction is executed, the currently running VM number register 1081 of FIG. 18, PSW 1020 (FIG. 12) of the CPU 1000', the corresponding entry of the prefix control table of FIG. 13, the corresponding entry of the translation table address control table 2400 of FIG. 14, the corresponding entry of the VM control table of FIG. 15, real interruption priority order status register 1045 of FIG. 21 and VMS control flags of FIG. 19 are initialized.

Let us assume that the I/O instruction is issued from the OS on the VM. The I/O execute circuit 1030' of the CPU 1000' carries out the following processings under the control of the microprogram 1050'.

(1) If not in the high speed VM mode (VMS control flag H="0", see FIG. 19), the VMCP is interrupted by reflecting the interruption to the PSA 2100 of the VMCP by using the prefix register 1010 of the VMCP (FIG. 12).

(2) In the high speed VM mode (VMS control flag H="1"), whether the VM I/O direct execution mode (VMS control flag D="1") or not is checked (FIG. 19).

(3) When D="0", the VMCP is interrupted.

(4) When D="1", the VMS control flag R is checked. If R="0", the corresponding virtual sub-channel number translation table 2600 is looked up to translate the given virtual sub-channel number to a real sub-channel number. If the virtual interruption priority order is given by the instruction operand, the interruption priority order translation table is looked up to translate it into the real interruption priority order. Whether it is dedicated to or not is checked by the real interruption priority order dedication status register 1049, and it is written into the status field of the VM information area 2092' of the sub-channel control block (FIG. 16).

The correspondence between the virtual interruption priority order and the real interruption priority order is also written. When R="1", no translation is required and the same values are written.

Figure 8:
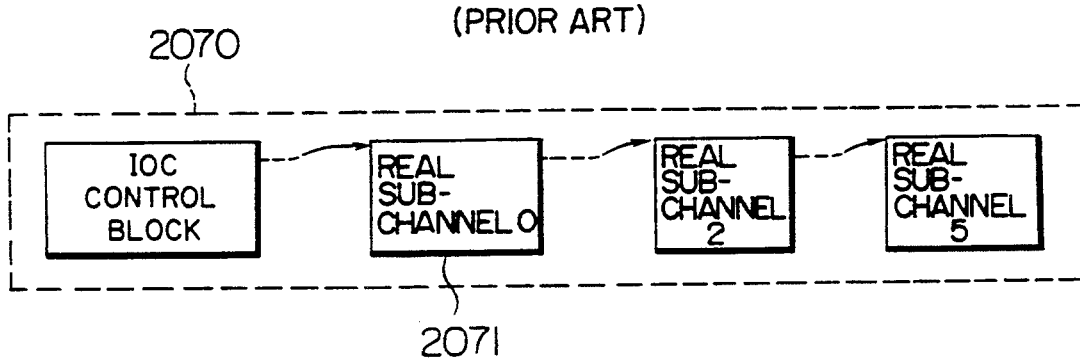

(5) When the real sub-channel control block 2091' (FIG. 16) obtained is the dedicating sub-channel and has the exclusive interruption priority order, the I/O instruction is executed. The subsequent operation is similar to that in the real computer system. When an asynchronous I/O device operation is required, the sub-channel is queued in the I/O request queue 2070 (FIG. 8). A condition code and control are returned to the program which issued the I/O.

(6) If the real sub-channel obtained is the shared sub-channel or the interruption priority order is shared, the VMCP is interrupted and the simulation is effected. The remaining processes are entrusted to VMCP's simulation.

(7) If the I/O instruction issued by the OS on the VM is one which examines an I/O interrupt request acceptable by the virtual interruption priority order (acceptable by the virtual interruption priority order mask), the following processing is carried out. The interrupt request is checked for the real dedication interruption priority order of the currently running VM. If there is no I/O interrupt request, the shared interruption priority order should be checked. Since the VMCP controls the interrupt retention for the shared interruption priority order, it is necessary to transfer the control to the VMCP. However, since this is contrally to the principle of direct execution, the control flag N (FIG. 19) of the VMS is used. When N="1", it means that VMCP holds the I/O interrupt retention to be checked (acceptable by the shared interruption priority order and the virtual interruption priority order). Accordingly, the VMCP is interrupted. When N="0", there is no such I/O interrupt retention and the VMCP need not be interrupted and the direct execution is permitted. The I/O interrupt processing is now explained.

Figure 9:
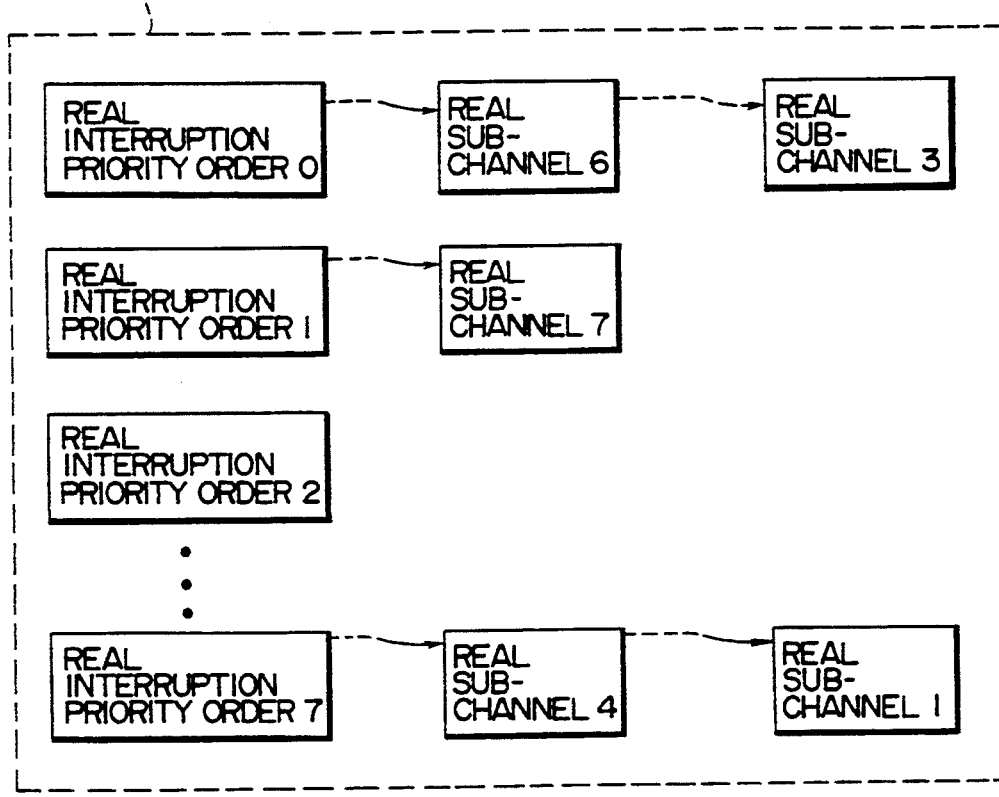
Figure 11:
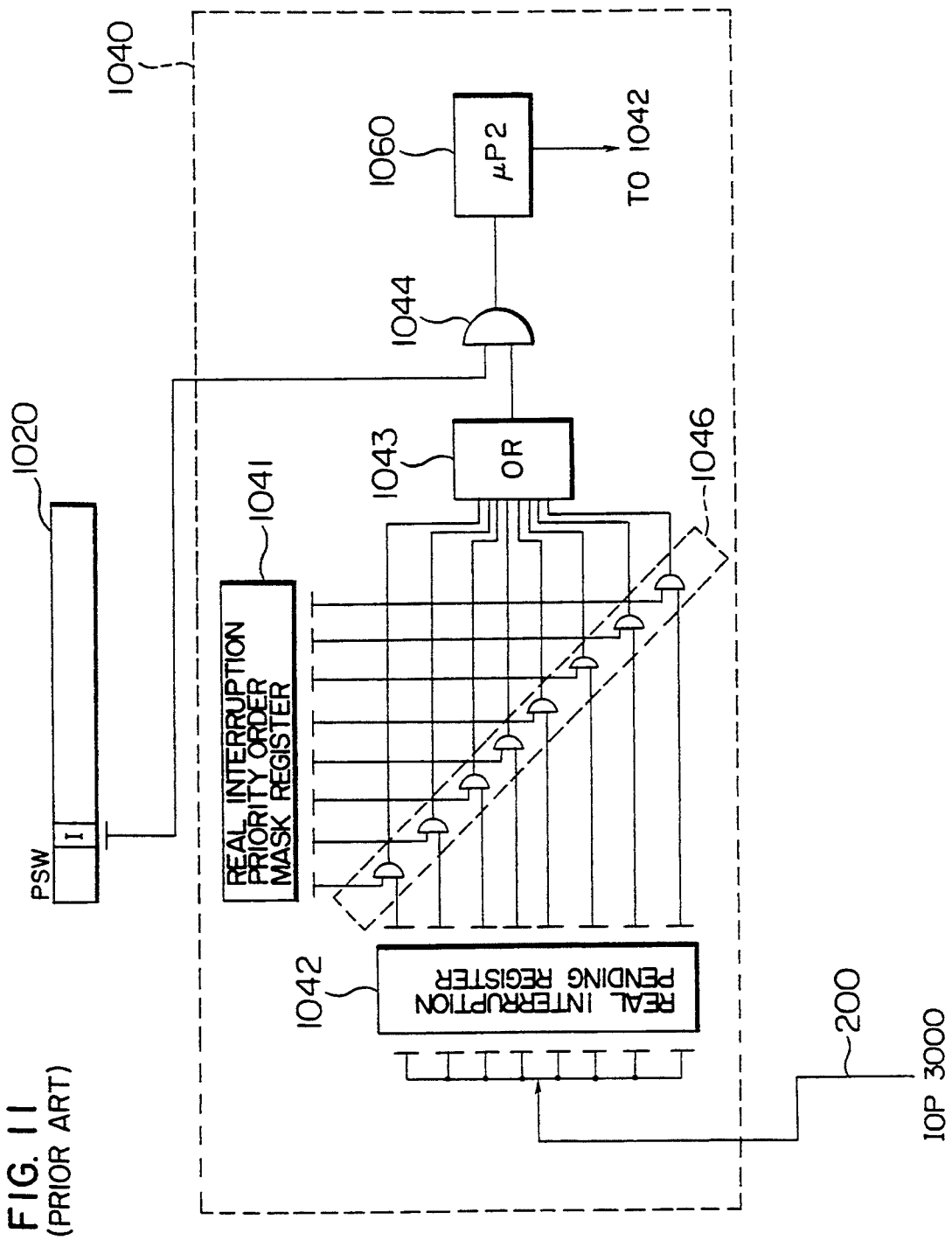

(1) The I/O interrupt request from the I/O device is detected by the IOP 3000' and the corresponding real sub-channel control block is queued in the corresponding real interruption priority order of the I/O interrupt request queue 2080 of the HSA 2001 (see FIG. 9), as is done in the prior art system.

(2) The IOP 3000' shown in FIG. 22 sets the corresponding bit of the real interrupt pending register 1042' to "1", as is done in the prior art system.

(3) The real interruption priority order mask register 1041' is set in the manner described before. The I/O interrupt circuit of FIG. 22 operates in the manner described above. Let us assume that the I/O interruption was started and the control was transferred to the I/O interrupt processing microprogram 1060'.

(4) If the interruption occurs with the real dedicated interruption priority order of the VM, the occupying VM can accept the interruption for the virtual interruption priority order because of the settings in the real interruption priority order mask register 1041' and the real interruption priority order status register 1045. If the occupying VM cannot accept the interruption, the I/O interruption cannot occur for that real interruption priority order by the actions of the I/O mask of the PSW 1020 and the registers 1041' and 1045, and the control is not transferred to 1060' but it is made pending by the hardware.

(5) The I/O interrupt microprogram 1060' carries out the following processings.

(i) Dequeues the real sub-channel of the I/O interrupt request queue 2080 (FIG. 9) on the real interruption priority order c requested the interruption.

(ii) Checks the VM mode flag bit V and the high speed VM mode flag H of the VMS control flag 1090' (FIG. 19), and if V="0" or H="0", reflects the interruption to the PSA of the VMCP. The PXR 1010 of the VMCP (FIG. 12) is used.

(iii) If V="1" and H="1", checks the I/O direct execution mode bit D of the VM. If D="0", it is not the I/O direct execution mode, and reflects the interruption to the PSA of the VMCP.

(iv) If D="1", the following processings are carried out.

(a) Whether the sub-channel is dedicated to or not is determined by the status field (FIG. 16) in the real sub-channel control block, and if it is the shared sub-channel, reflects the interruption to the PSA of the VMCP.

(b) If the real interruption priority order c requesting the interruption is dedicated to the currently running VM, that is, if the corresponding bit of the real interruption priority order status register 1045 is "0" (see FIG. 21), reflects the interruption to the PSA of the currently VM to continue the current VM. The VM prefix register 1070 (FIG. 12) is used. The I/O interrupt information to the VM prefix is reflected by the virtual sub-channel number in the real sub-channel control block 2092' or the virtual interruption priority number.

(c) When the real interruption priority order c is dedicated to other VM, the interruption is reflected to the VMCP. Then, the interruption is reflected to the PSA of the VM by the VMCP.

(d) When the real interruption priority order c is shared, the interruption is reflected to the VMCP. Then, the interruption is reflected to the VM by the VMCP. The VM may not accept the interruption. In such a case, the I/O interruption is made pending by the VMCP.

As described above, when the sub-channel is dedicated and has the dedication real interruption priority order, the I/O direct execution (without the intervention of the VMCP) of the OS on the VM is supported for that sub-channel. For the I/O interruption, only the I/O interruption from the sub-channel dedicated to the current running VM is directly executed. For the I/O interruption from the sub-channel dedicated to other VM, the VMCP is to intervene because of necessity for scheduling of the VM's.

The direct I/O execution mode suppress flag of the status field 2093 in the real sub-channel control block of FIG. 16 is normally "0" so that the direct I/O execution mode of that sub-channel is supported. In the dedicating sub-channel, the I/O instruction is not issued from the OS on the VM other than the occupying VM but it may be issued from the VMCP. In this case, the direct I/O execution mode suppress flag 1 in the status field 2093 is set to "1" until the I/O of the VMCP is completed so that the I/O direct execution mode for that sub-channel is suppressed.

Accordingly, this flag is set and reset under the control of the VMCP. In the above I/O execution system, the followings are pointed out.

(a) The R bit of the VMS control flags 1090' (FIG. 19) may be omitted. It is not necessary if the virtual sub-channel number and the virtual interruption priority order are always translated, or if those numbers are always equal when the direct I/O execution system of the present invention is applied in the VMS.

(b) The D flag may be substituted by the H flag, but the high speed VM mode flag H cannot control the direct execution of only the I/O instruction because it also controls the direct execution of the privileged instruction other than the I/O instruction.

(c) In the I/O interrupt processing, the I/O interruption from the real interruption priority order dedicated to the VM other than the currently running VM is reflected to the VMCP, as described above. Since the occupying VM can accept the interruption, the interruption may be reflected to the PSA of that VM and then the control may be transferred to the VMCP in a form of VMCP call. The address of the PSA of the VM can be determined from the prefix control table of FIG. 13. In this case, it is necessary to determine the PSW of the VM and information therefor is required. It may be determined based on the VM number in various ways, although it is not illustrated.

(d) The start address of the sub-channel number translation table, the start address of the interruption priority order translation table, the real interruption priority order status register 1045 and the real interruption priority order dedication status register 1049 (FIG. 21) are all initialized by the operand of the start VM instruction (see FIG. 17). Alternatively, they may be initialized by a separate instruction of the VMCP.

As described hereinabove, in accordance with the present invention, the I/O instruction issued by the OS on the VM and the I/O instruction can be directly executed so that the I/O simulation overhead of the VMCP can be substantially reduced. This is an essential function to attain a virtual machine which has a performance very close to that of a real computer.

Next, description will be made of a second embodiment of the invention. A computer system is run either in real computer mode or in virtual machine mode. The former is also called real machine mode. In the real machine mode, only one operating system (OS) can be run. On the other hand, in the virtual machine mode, multiple OSs can be run concurrently in the single computer system. All the following descriptions hold true to both modes unless otherwise specified.

In the first place, problems from which the prior art systems suffer will be discussed.

At present, the capacity of a single magnetic disk storage unit (hereinafter referred to simply as the storage unit) keeps on increasing steadily, which is accompanied with the problems mentioned below.

(1) In a system configuration in which the storage unit is shared by a plurality of operating systems, the whole storage unit is temporarily reserved by one system for exclusive control thereof. Consequently, reserving or occupation of the storage unit by a given system (referred to as system A) exerts a great influence to other systems in accessing to the same storage unit. More specifically, even in the case where other system demands access to an area of the storage unit which is utterly different from the area used by the system A, the access of the other system to the storage unit is forcibly queued because the whole storage unit is reserved by the system A. This is a problem, which becomes more serious particularly when the system A has reserved the whole storage unit over a long time or when a system-down takes place in the state in which the storage unit is reserved, because the accesses to the storage unit by other systems are all inhibited.

(2) The second problem occurs in only virtual machines. There is proposed such a storage unit control scheme in which a storage unit is divided on a cylinder-by-cylinder basis into a plurality of so-called mini-disks by software so that each of the mini-disks is made available for the OS, as exemplified by systems "VM/XA" and "VM/ESA" commercially available from IBM company. However, I/O instruction of the OS running on the VM for the mini-disk can not directly be executed. This is because at most one subchannel is defined for the channel path and the storage unit or for a plurality of channel paths and the storage unit according to the current practice. Further, the subchannel is a logical representation for the OS and serves as a management entity for controlling the storage unit. Accordingly, there exists no means for managing the areas such as the mini-disks resulting from division of the storage unit in hardware, i.e. in Input/Output Processor (IOP). This in turn means that the performance of the VM using the mini-disk is degraded, and thus it is impossible for the VM to enjoy the performance approximating that of the real computer. This is another problem.

With the second embodiment of the invention, it is contemplated to provide an apparatus which can solve the problems mentioned above. To this end, if it taught according to the invention to define a management entity which may be termed a logical resource control block (hereinafter also referred to as LRCB in abbreviation). More specifically, assuming that the storage unit is divided into areas which do not overlap one another (e.g. files defined by the OS or mini-disks defined by the VMCP), the LRCB is a logical representation of the area resulting from the division. These LRCBs are assumed to be defined by the user simultaneously with definition of the subchannels or I/O generation. The LRCB is defined at most one to the combination of the divided part and a channel path similar as the subchannel is defined. The LRCB can assume one of the states "busy", "free", "status pending" and "not operational", as in the case of the parent subchannel. The IOP manages the LRCB as the logical resource and accepts or admits only one I/O request to the logical resource. Heretofore, the OS issues the I/O instruction by designating the subchannel number. In contrast, in the case of the IOP according to the second embodiment of the invention, it is possible to designate additionally the logical resource number (hereinafter referred to as LRN in abbreviation). Heretofore, in the IOP, the subchannel (or the request block including the address of the subchannel) issued the I/O request is queued for the logical control unit. According to the teaching of the invention incorporated in the instant embodiment, the LRCB (or the request block containing the address of the LRCB) to which the I/O request is issued is also queued. In that case, the relevant LRCB is queued mixedly in the same I/O request queue as the parent subchannel is queued in. The second I/O request issued successively to the same LRCB (i.e. the I/O request issued before completion of the immediately preceding I/O request) is rejected because the LRCB mentioned above is in the state "busy". This busy state is messaged to the OS. This operation is substantially the same as that of the subchannel known heretofore. According to the second embodiment of the invention, the subchannel having the logical resource (LRCB) is regarded to be "free" by the IOP when at least one of the LRCBs which are under the control of that subchannel is in the state "free". By virtue of the arrangement described above, the IOP can accept a number of I/O requests corresponding to that of the logical resources (LRCB) held by the subchannel to which the I/O request is issued, in contrast to the IOP known heretofore which can accept no more than one I/O request for the subchannel. Heretofore, in the IOP, an activation or start signal is sent to the I/O control unit (IOC) by using an identifier of the channel path in the subchannel and the unit address (UA) (i.e. physical address of the unit). In the case of the system according to the instant embodiment, the logical resource number (LRN) is additionally sent to the I/O control unit or IOC, which in turn is adapted to manage the channel path identifier, the unit address and the LRN. The I/O interruption request generated by the storage unit is sent to the IOP through the relevant channel path by the I/O control unit or IOC as in the case of the system known heretofore. It should however be noted that the LRN is also sent to the IOP in addition to the UA in the system according to the instant embodiment of the invention. In response, the IOP sets the I/O interruption request at the relevant logical resource control block or LRCB of the relevant subchannel. The I/O interruption request of the LRCB is assigned with the same interruption priority order as the parent subchannel and is queued at a place of the same interruption priority order (i.e. subclass).

Owing to the arrangements described above, the problems mentioned hereinbefore can be solved satisfactorily. First, in conjunction with the problem (1), it will now be appreciated that the systems by which the storage unit is shared can logically reserve only a necessary portion of the storage unit, e.g. only the file to be used without necessity for reserving the storage unit as a whole. Accordingly, both systems mentioned hereinbefore in connection with the problem (1) can simultaneously access to the storage unit, provided that the logical resource names of concern differ from each other. Thus, the frequency of such situation in which the other system is caused to wait for in accessing the storage unit can be reduced down, because it is only when both the systems make access to the logical resource of the same name that one of the systems is forced to wait for.

Concerning the problem (2), the I/O instruction of the OS on the VM can directly be executed by defining the logical resource (LRCBs) as the mini-disks, and by dedicating the LRCBs to the individual VMs, by virtue of such arrangement that the I/O requests to the individual LRCBs are queued in the I/O request queue to be scheduled by the IOP as with the case of the I/O requests to the subchannels. In addition, the IOP has to have ability to relocate cylinder numbers to directly execute channel command words (CCWs) given by OSs in VMs for the mini-disks. The ability is a prior art, however.

Now, the second embodiment of the present invention will be described in detail.

Figure 23:
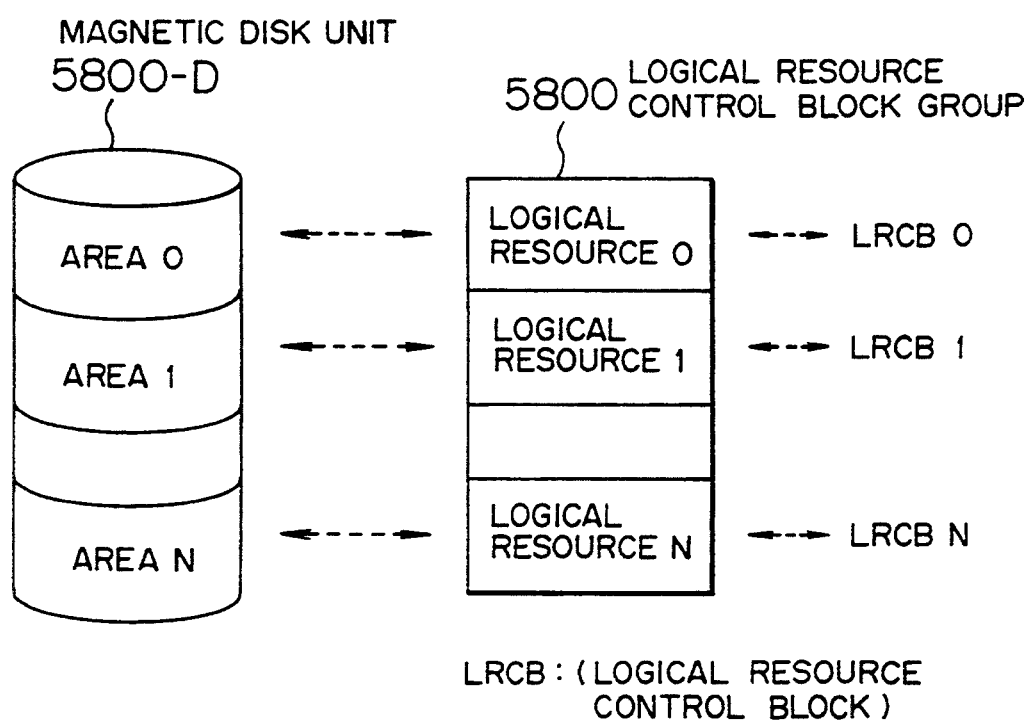
FIG. 23 shows the concept of the logical resource adopted according to a second embodiment of the invention.

FIG. 23 shows the concept underlying the logical resource. In division of the total storage area of a magnetic disk storage unit 5800-D into areas which do not overlap one another, a logical representation entity of the area resulting from the division is referred to as the subchannel logical resource or simply as the logical resource, while the control block on the main memory 2001 representing the logical resource is referred to as the logical resource control block or LRCB in abbreviation. In FIG. 23, there is shown a LRCB group 5800 comprising a succession of LRCBs. A LRCB is defined only when a subchannel, which is logical representation of a device, is defined, and exclusively placed under the subchannel. That is, the LRCB is defined at most one to a combination of the divided part and a channel path. Therefore, in general, plural LRCBs may be defined to the same divided part only when plural subchannels are defined to the original device. Then, the LRCBs have the same logical resource number. In other words, the LRCBs are objects which divide the subchannels. The division of the storage unit is performed by the user at the time of I/O generation. OSs can define and process the LRCBs as files. That is, the OSs are allowed to make each LRCB correspond to each file.

Figure 24:
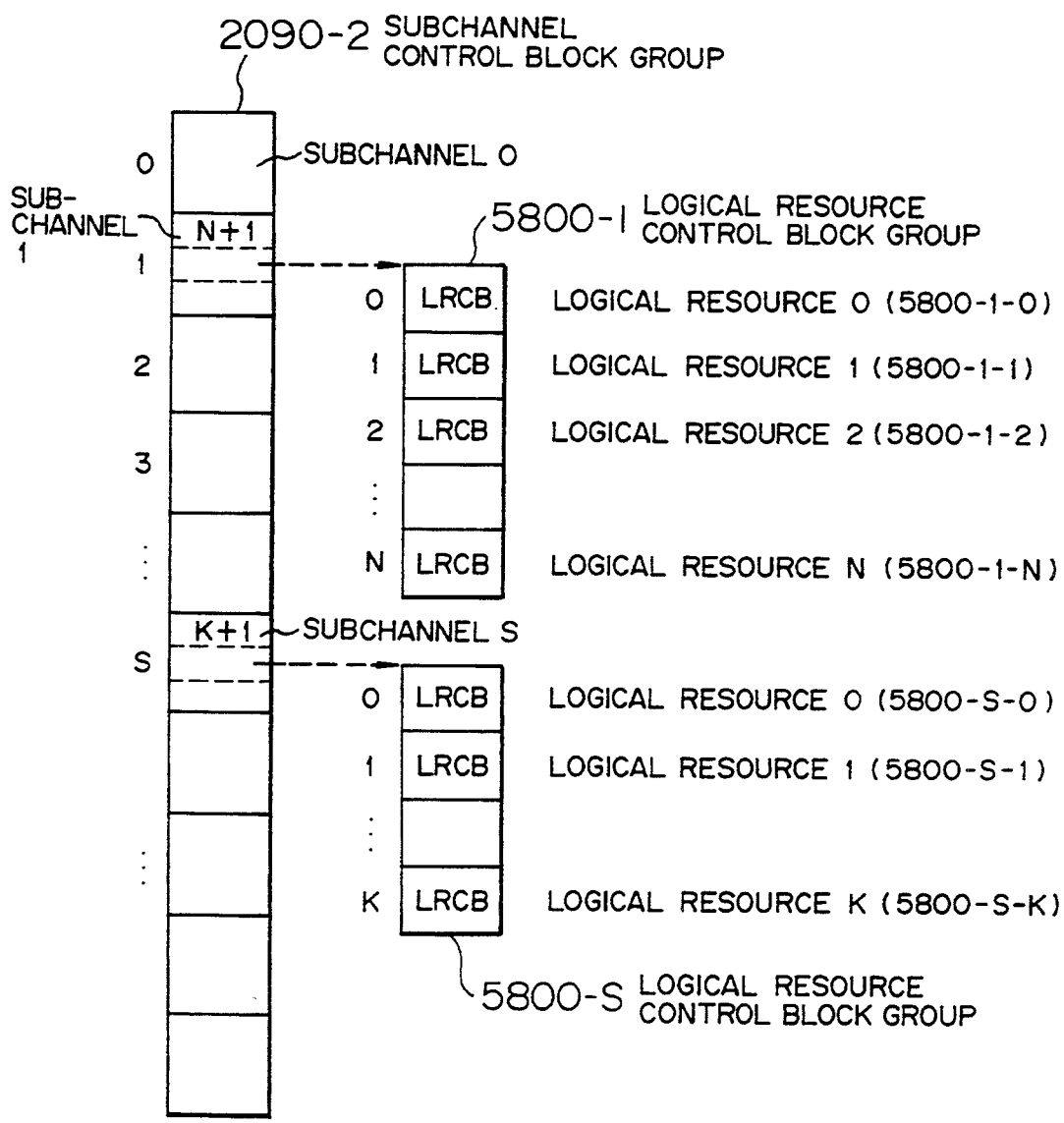
FIG. 24 is a diagram for illustrating relationship between subchannels and the logical resources.

FIG. 24 is a diagram for illustrating relationships between the subchannels and the logical resources therefor. The subchannels are defined as the subchannel control blocks as with the case of the system known heretofore and arrayed in the form of successive areas 2090-2. For each of the subchannels, the logical resources are newly defined. By way of examples, the logical resources 0, 1, . . . , K are defined for the subchannel S. These logical resources are secured in succession as a logical resource control block group 5800-S. Each of the logical resources is represented as a logical resource control block (LRCB).

Figure 25:
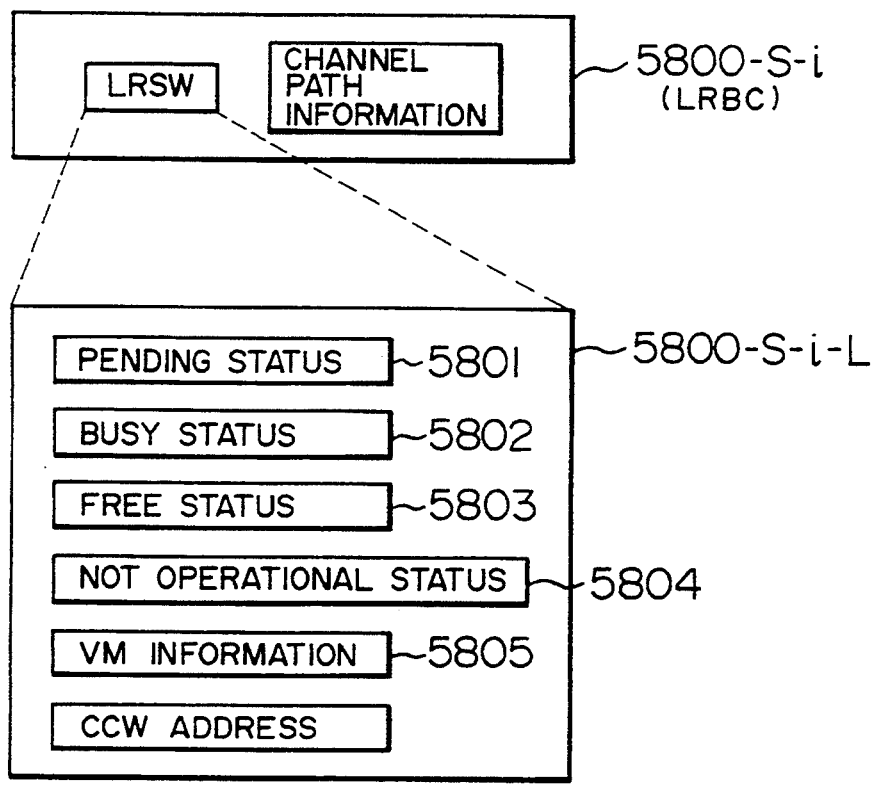
FIG. 25 is a view showing a structure of a logical resource status word which is contained in a logical resource control block.

FIG. 25 is a view showing a structure of a logical resource status word or LRSW for short which is contained in the logical resource control block or LRCB 5800-S-i. The LRSW indicates the statuses of the LRCB which include a pending status, a busy status, a free status and a not-operational status. Additionally, the LRSW contains a start address of a CCW (Channel Command Work) execution sequence representing operation of the input/output device. This information is identical with that contained in the subchannel known heretofore in the real computer system. It should also be noted that the LRSW contains newly a VM information area 5805, the content of which corresponds to the VM information area 2092' in the subchannel 2091' shown in FIG. 16.

Figure 26:
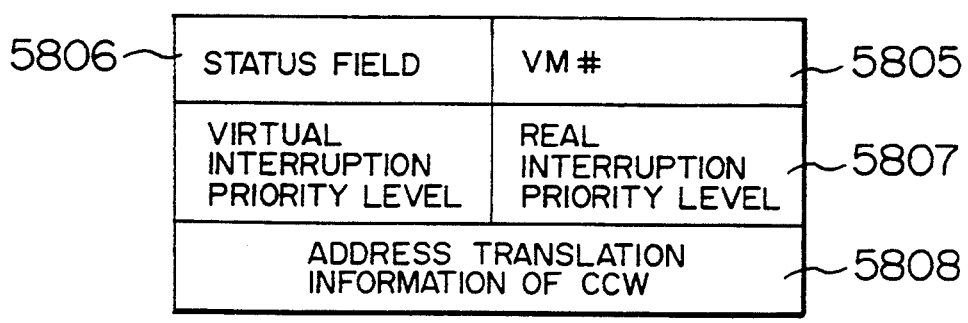
FIG. 26 is a view showing in detail a VM information area in the logical resource control block.

FIG. 26 is a view showing in detail the VM information area 5805 in the logical resource control block (LRCB). Referring to the figure, the VM information area 5805 contains a status field 5806, an occupant VM number VM# reserving the LRCB, virtual/real interruption priority levels 5807 and CCW address translation information 5808. The meanings of these data as well as the setting method therefore are same as those for the corresponding ones of the VM information area 2092' in the subchannel 2091'. It should however be noted that the flag bit in the status field does not represent the reserved status of the subchannel but indicates the reserved status of the relevant logical resource control block or LRCB. The VM information area 5805 and 2092' are defined in virtual machine mode, and also in real machine mode. In real machine mode, the real machine is considered as only one virtual machine in the system. That is, then, the occupant VM number (VM#) is 0, the LRCBs are always dedicated, the real interruption priority orders are always dedicated, and virtual interruption priority orders are always equal to real interruption priority orders.

Figure 27:
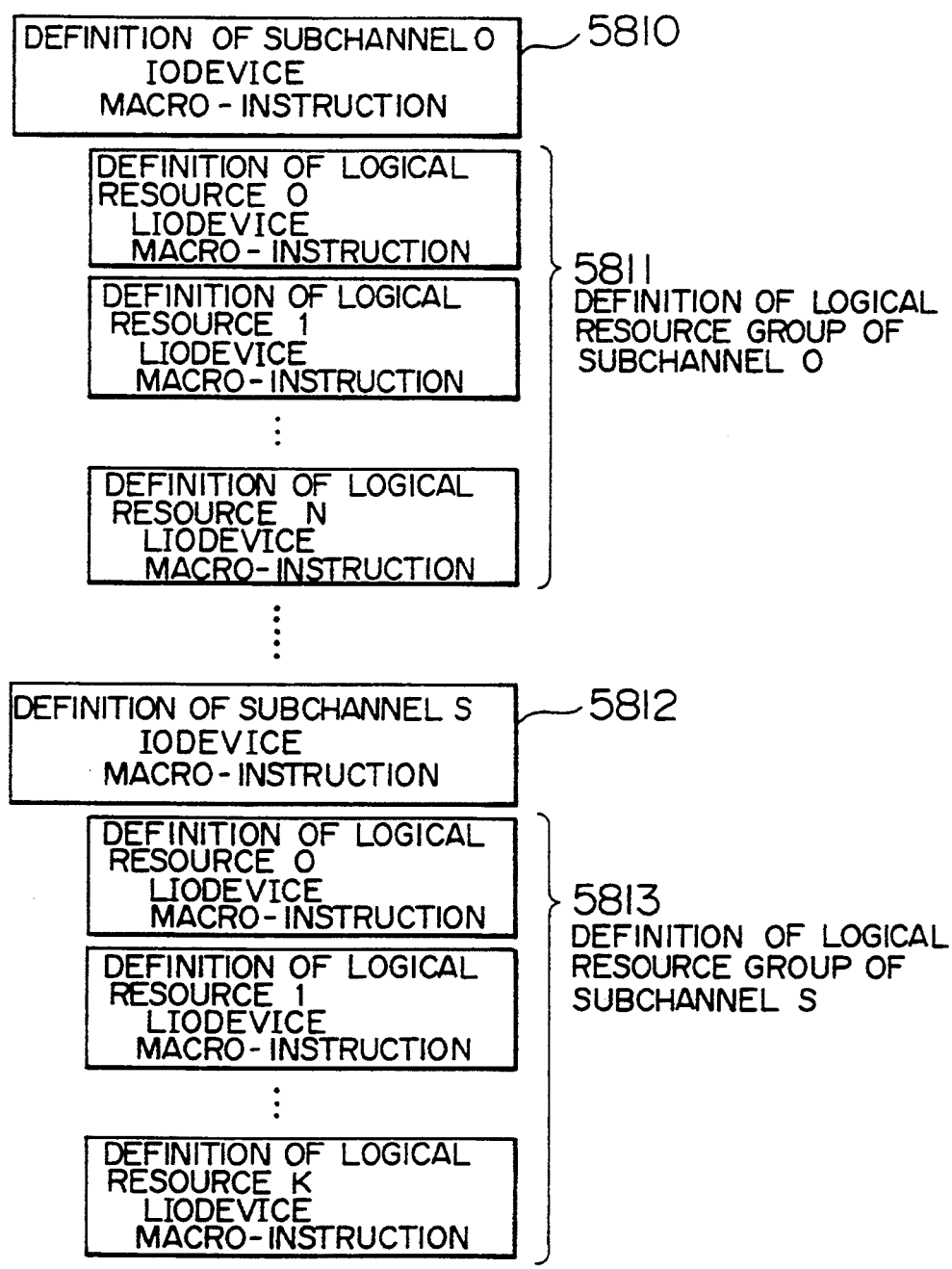
FIG. 27 is a chart for illustrating a logical resource definition method.

FIG. 27 is a chart for illustrating a logical resource definition method which is carried out by the user upon generation of the I/O system. More specifically, the user defines a number of logical resource definition statements 5811 and 5813 as required immediately in succession to the conventional subchannel definition statements 5810 and 5812, respectively. By processing the logical resource definition statement, the structure of the logical resource shown in FIG. 24 is defined. In practice, the logical resource structure shown in FIG. 24 is constructed at the time of system initialization. In the real machine mode, it is at IPLing the OS, on the other hand, in the virtual machine mode, it is at IPLing the VMCP.

FIG. 28 is a view for illustrating, by way of example, queuing of the I/O request in the logical resource. When the subchannel has the logical resources, only one I/O request is accepted for each logical resource or LRCB. As shown in FIG. 25, the logical resource or LRCB has the same statuses similar to those of the subchannel, wherein when the LRCB is in the free status, the I/O request is accepted by the LRCB, which is then set to the busy status after the I/O request has been scheduled by the IOP. The control to this end is performed by the IOP. As can be seen in FIG. 28, the I/O requests to the logical resource (LRCB) is queued mixedly with the I/O request to the subchannel.

FIG. 29 is a view showing a structure of a logical resource control table (or LRCT for short) provided in the input/output control unit (IOC). When the storage unit is shared by the OSs on the real computer system and/or OSs on the VM, each OS has to use the storage unit by reserving the logical resource (LRCB). In that case, the OSs have to use a same logical resource number defined for the storage unit. Although the logical resource number is defined definitely in the relevant storage unit, there may arise such a case in which the same logical resource number is used in another storage unit. Under the circumstances, a physical unit address (PUA) is established for identifying definitely the storage unit in the system. Additionally, an identifier of a channel path or a channel path group reserving the logical resource LRCB) is registered as well. The information mentioned above is set through the processing of the I/O instruction issued by the OS for reserving the logical resource, which processing is carried out asynchronously by the IOP and the IOC after the issuance of the I/O instruction.

FIG. 30 shows a structure of a channel path group control table (CHPGCT) 5830 provided in the IOC. In order to allow each OS to directly issue the I/O request to each logical resource (LRCB) in the subchannel, a path group is implemented for each logical resource (LRCB), wherein an identifier of the path group and path mode thereof 5834, the logical resource number (LRN) 5833 and the physical unit address (PUA) 5832 are registered for each channel path, which is identified by a channel path identifier (CHPID) 5831.

FIG. 31 shows an example of queuing the I/O interruption requests issued to the subchannels and the logical resources (LRCB). As can be seen in the figure, the logical resource (LRCB) has a same interruption priority level as that of the parent subchannel, and the I/O interruption requests to the logical resources are queued mixedly with the I/O interruption requests issued to the subchannels.

FIG. 32 is a view showing a format of an extended start subchannel (SSCH) instruction 5840 which is the I/O instruction extended according to the teaching of the invention incarnated in the instant embodiment. In connection with the extended start subchannel (SSCH) instruction, there are provided a general purpose register 1 containing the subchannel number and an operation request block or ORB 2800-1, as in the case of the conventional system. According to the instant embodiment, there are newly provided a logical resource number 5842 and a validity bit (v) 5841 in the ORB 2800-1. When the OS uses the logical resource in the subchannel, the relevant logical resource number (LRN) must be designated in the ORB in addition to the subchannel number.

Figure 33:
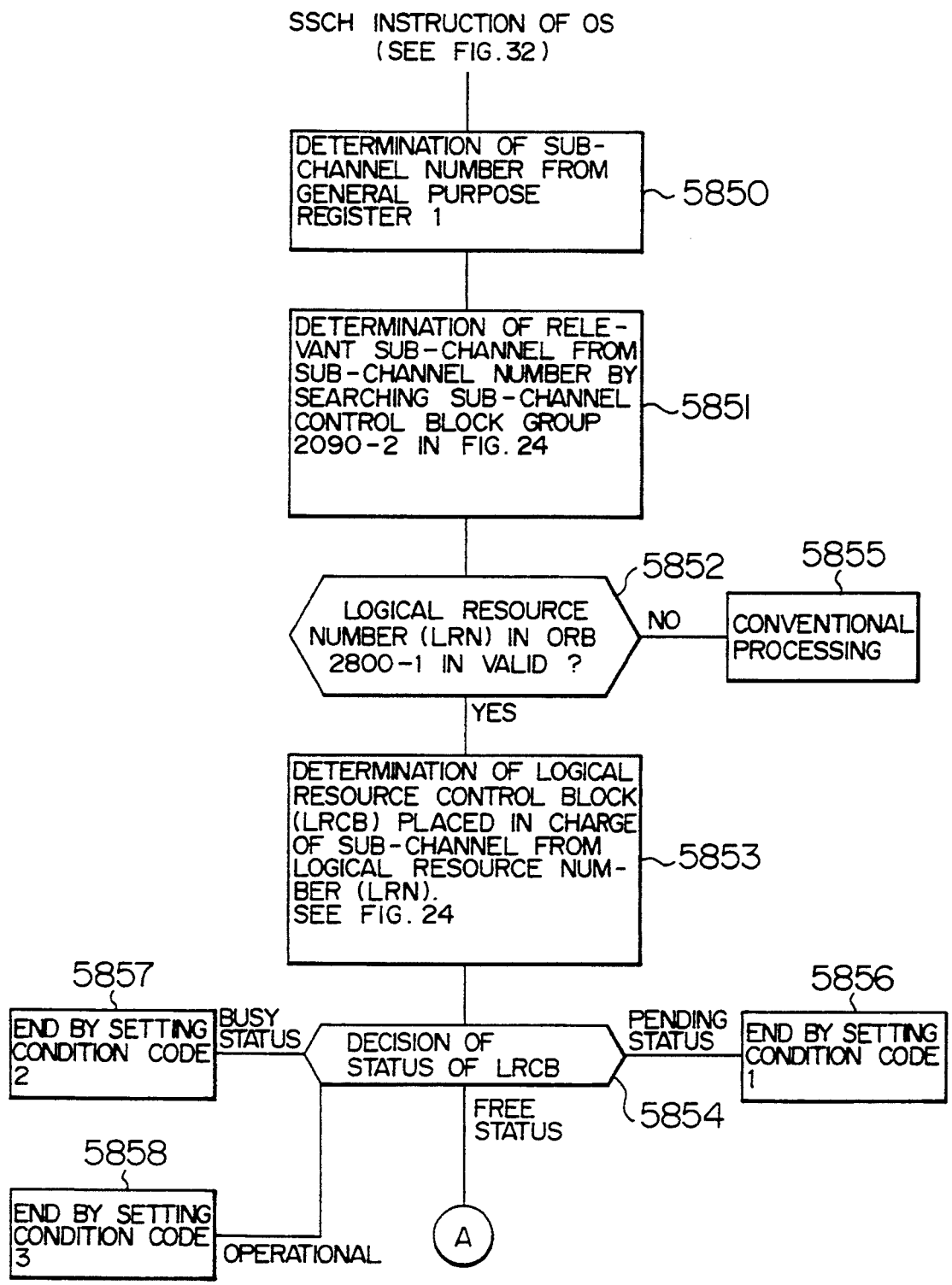
FIGS. 33 and 34 show flow charts for illustrating operation of a CPU involved in executing the start subchannel instruction.
Figure 34:
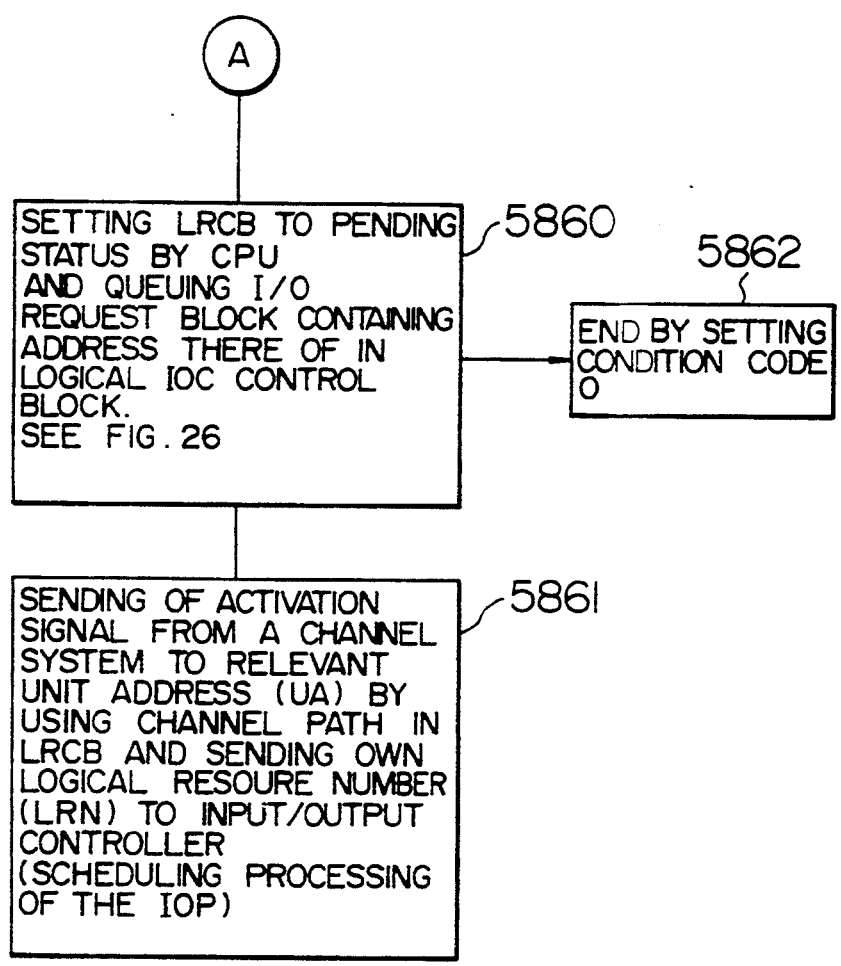

FIGS. 33 and 34 show flow charts for illustrating operation of the CPU involved in executing the start subchannel or SSCH instruction. Execution of the SSCH instruction may include the steps mentioned below. These steps are executed through cooperation of the I/O instruction executing circuit 1030' and the microgram 1050 shown in FIG. 12, unless specified otherwise.

(1) On the basis of the subchannel number constituting an operand of the SSCH instruction, the subchannel of concern is determined (steps 5850 and 5851)

(2) From the operand ORB, the logical resource number (LRN) is determined. In case the logical resource number (LRN) is invalid, the subsequent processing is performed, as in the case of the conventional system. On the other hand, when the LRN is valid, the relevant logical resource control block or LRCB is determined on the basis of the LRN (steps 5852, 5853, 5855).

(3) The status of the LRCB thus determined is decided. When it is in the pending status, the condition code is set to "1", whereupon the processing comes to an end (steps (5854, 5856), as in the case of the prior art system in which the processing is ended when the subchannel is in the pending status. In this conjunction, the phrase "pending status" is used to indicate the status in which the I/O request by the SSCH instruction remains queued or the status in which the interruption is pending.

(4) When the status of the LRCB as determined is busy, the condition code 2 is sent back, whereupon the processing is completed (steps 5854, 5857).

(5) The expression that the LRCB is busy has the same meaning as the expression that the subchannel is busy in the prior art system and indicates that the LRCB is scheduled by the IOP and currently participates in the I/O operation (steps 5854, 5857).

(6) When the LRCB is in the not-operational status, the condition code 3 is sent back, whereupon the processing is ended (steps 5854, 5858).

(7) When LRCB is free, the I/O request of concern is accepted, whereon the LRCB is set to the pending status (indicative of pending of the SSCH instruction) and the I/O request block containing the relevant address is queued (step 5860). At this time point, the processing executed by the CPU comes to an end by issuing the condition code 0 (step 5862).

(8) Subsequently, the IOP performs the scheduling for the I/O request queue shown in FIG. 28. At this time, the LRCB is also scheduled similarly to the subchannel scheduling. In this case, the logical resource number is also sent to the input/output control unit in addition to the unit address via the relevant channel path (step 5861).

In the foregoing, description has been made of the method for executing the extended SSCH instruction in the real computer mode. In the virtual machine (VM) mode, the processing steps for the VM are added. More specifically, when the CPU is in the VM mode, processing steps mentioned below are executed after having determined the relevant LRCB through the processing in the step 5853 shown in FIG. 33.

(a) The LRCB has a VM information field 5805 in which the occupant VM number VM#is stored, as indicated at 5805 in FIG. 26. The occupant VM number VM# is set by the VMCP previously (before running of OS on the VM) when the logical resource is dedicated, as in the case of the occupant VM# in the subchannel refer to 2092' in FIG. 16).

(b) Decision is made as to whether the running VM number (denoted by 1081 in FIG. 18) is equal to the VM number placed in the LRCB.

(c) When the equality is decided and when the status field of the LRCB indicates the dedication and unless the I/O direct execution mode is suppressed, into the processing proceeds to the LRCB status decision step (step 5854 in FIG. 33) for thereby executing the similar processing as in the case of the real computer mode.

(d) Unless the conditions mentioned in the above paragraph (c) are satisfied, the direct execution is given up, whereon interruption is made to the VMCP, entrusting the processing to the simulation of the VMCP. VMCP manages virtual LRCBs, which are logical views of real LRCBs to OSs in VMs, just in the similar way as virtual subchannels, which are logical views of real subchannels to OSs in VMs. The real LRCBs are management entities of the IOP as shown in FIG. 24 at (5800-S-0, 5800-S-1, . . . ).

The virtual LRCBs are defined by the VMCP, and contain statuses, which are views from OSs in VMs, of the corresponding real LRCBs.

This virtual LRCB management is real easily from prior art of software.

In the foregoing, description has been made of operations of the CPU and the IOP performed for the extended SSCH instruction shown in FIG. 32.

In the following, we state the processing executed by the input/output control unit, which processing corresponds to that executed by the IOP shown in FIG. 34 at 5861.

The IOP schedules the relevant logical resource control block (LRCB) to fetch the CCW from the main memory, which is then sent to the input/output controller or IOC, as with the case of the conventional system. The IOC interprets the CCW sent thereto for execution thereof. When it is the CCW indicating the reserve, which CCW has the same format as conventional CCW, the logical resource control table (LRCT) shown in FIG. 29 is structured, whereby the exclusive control of the LRCB is rendered possible.

That is, a logical resource (LRCB) of a device is reserved, and not the whole device. Therefore, different logical resources (LRCBs) can be reserved at the same time with their resource numbers being registered in the logical resource control table (LRCT). When the logical resource number sent by the IOP is already registered in the LRCT, the IOC rejects the reserve request indicated by the CCW, and the IOP, corresponding to the rejection, queues the I/O request of the LRCB. The IOP reschedules the I/O request when the logical resource represented by its number is released by other OSs. In case the CCW is a command for constituting the channel path group, the channel path group control table (CHPGCT) shown in FIG. 30 is structured. As a result of this, the channel path group can be implemented for the LRCB.

Now, let as assume that an I/O interruption request is issued from an I/O device. In that case, in the prior art system, the relevant unit address (UA) is sent to the IOP from the input/output control unit or IOC via the corresponding channel path. In the system according to the instant embodiment of the invention, the relevant logical resource number (LRN) is additionally sent to the IOP, which then detects the relevant LRCB to place the interruption request in the interruption queue at the corresponding interruption priority level (FIG. 31). For the interruption request "busy to free" issued from the storage unit, the IOP schedules the I/O requests to the LRCB and the subchannel in the conventional manner. Further, for the abovementioned I/O interruption request, the IOP finds the relevant LRCB to place the interruption cause in that LRCB to set the LRCB in the pending status. This processing is same as the processing which is conventionally performed by the IOP for the subchannel. This processing is carried out in both VM mode and real computer mode. In the following, we add explanations for VM modes. That is, the I/O interruption cause set in a logical resource (LRCB) is directly executed only when the real interruption priority order of the LRCB is dedicated to the running OS. The LRCBs have the same real interruption priority orders as the parent subchannels. Therefore, the I/O interruptions set in the LRCBs are processed in the same manner as in the parent subchannels.

According to the second embodiment of the invention described above, there can be obtained the advantageous effects mentioned below.

(1) The magnetic disk storage unit of a large capacity can be divided into areas (logical resources) which do not overlap one another, wherein the each area can be shared by a plurality of systems in carrying out a plurality of processings. By virtue of this feature, the time taken for the reserving can remarkably be reduced, whereby the sleeping of the individual system can correspondingly be reduced.

(2) The OS on the virtual machine (VM) can make use of the individual areas mentioned above. Additionally, the I/O instructions can directly be executed for the individual areas, whereby the CPU performance of the VM can significantly be enhanced.

We claim:

1. In a computer system having a central processing unit, a main storage and at least one I/O device, wherein a plurality of operating systems can simultaneously run under the control of a control program, a method of executing an I/O instruction using said central processing unit, comprising steps of:

assigning, under control of said control program, a plurality of resident areas of said main storage which do not overlap one another to said plurality of operating systems as main memories therefore, respectively;

responding to an I/O instruction issued by a running one of said plural operating systems to thereby determine an address of said main memory assigned to said running operating system which participates in an I/O operation requested by said I/O instruction without intervention of said control program;

translating said address into an address of said main storage of said computer system without intervention of said control program; and executing said I/O operation by using the address resulting from said address translation.

2. In a computer system having a central processing unit and a plurality of I/O devices, wherein a plurality of operating systems can simultaneously run under the control of a control program, each of said I/O devices being assigned with one of plural subchannels which is representative of said I/O device for one of said plural operating systems, said plurality of subchannels being allocated with a plurality of predetermined real interruption priority levels, respectively, each of said plural real interruption priority levels being reserved by one of said plural operating systems or shared by several ones of said plural operating systems, wherein every time each of said plural operating systems issues an I/O instruction designating the subchannel, an I/O operation requested by said I/O instruction is executed for one of said plural I/O devices assigned the said designated subchannel representative of said one I/O device for the operating system which issued said I/O instruction, and wherein every time an interruption request indicating completion of the I/O operation is issued by any one of said plurality of I/O devices, said interruption request is registered in one of plural interruption request queues provided in correspondence to real interruption priority levels determined previously for said plurality of I/O devices, respectively, said one interruption request queue being provided in correspondence to a real interruption priority level assigned to said I/O device issued said interruption request, a method of executing an interruption request test instruction using said central processing unit, comprising steps of:

responding to an interruption request test instruction issued by one of the running operating systems to thereby check whether or not the real interruption priority level reserved by said one running operating system exists in said plurality of real interruption priority levels; and executing said interruption request test instruction when said reserved real interruption priority level exists, without issuing interruption to said control program.

3. An interruption request test instruction executing method according to claim 2, wherein execution of said interruption request test instruction includes the steps of:

checking whether or not at least one interruption request is registered in one of said plural interruption request queues which is provided in correspondence to said reserved real interruption priority level;

responding to existence of said registered interruption request for thereby making a decision as to whether or not an interruption mask determined by said running operating system for one of a plurality of virtual interruption priority levels provided for said running operating system which corresponds to said real interruption priority level is in the state allowing the interruption; and informing said running operating system of said one interruption as a result of execution of said instruction when said interruption mask is decided to be in the state allowing the interruption.

4. In a computer system comprising a central processing unit, an auxiliary storage unit, a IOP for scheduling execution of an I/O operation designated by an I/O instruction issued by one of plural programs which use said auxiliary storage unit, and an input/output control unit which responds to a result of execution of said I/O instruction for thereby executing an I/O operation requested by said I/O instruction for said auxiliary storage unit, wherein a plurality of operating systems can simultaneously run under the control of a control program, a method of executing an I/O instruction using said central processing unit, comprising steps of:

dividing, under the control of said control program, a memory area of said auxiliary storage unit into a plurality of memory areas which do not overlap one another;

assigning, under the control of said control program, said plurality of memory areas to said plurality operating systems such that at least one memory areas is reserved by at least one operating system;

checking, under the control of said control program whether any one of said memory areas is reserved by any one of said operating systems and storing, when said memory areas is occupied, an identifier associated with the operating system reserving said memory area in a control block provided in correspondence to said memory area being reserved;

responding to an I/O instruction issued by the running operating system to thereby make a decision as to whether the memory area designated by said I/O instruction is reserved by said running operating system on the basis of content of the control block stored in correspondence to said designated memory area; and executing said I/O instruction without interrupting said control program when the memory area designated by said I/O instruction is reserved by said running operating system.

5. A computer system, comprising:

a central processing unit;

an auxiliary storage unit;

a IOP for executing a channel command word designated by an I/O instruction issued by one of plural programs which use said auxiliary storage unit; and an input/output control unit responsive to a result of execution of said channel command word for thereby performing an I/O operation requested by said channel command word for said auxiliary storage unit, wherein said IOP stores states of a plurality of memory areas which are obtained by dividing a memory area of said auxiliary storage unit and which do not overlap one another, said memory areas being regarded as logical resources which are independent of one another, said IOP including control means for controlling execution of the I/O operation for the memory area requested by the channel command word executed by said input/output control unit on the basis of stored status of said requested memory area.

6. A computer system according to claim 5, wherein said control means incorporated in said IOP includes means responsive to a plurality of reserve requests for one of said memory areas shared by a plurality of programs which requests are outputted by a plurality of channel command words designated by a plurality of I/O instructions issued by said plural programs, for thereby accepting selectively one of said plurality of reserve requests.

7. A computer system according to claim 5, wherein said control means incorporated in said IOP includes means responsive to a plurality of I/O operation execution requests for one of said memory areas shared by a plurality of programs, which requests are outputted by a plurality of channel command words designated by a plurality of I/O instructions issued by a plurality of programs, for thereby accepting selectively one of said plurality of I/O operation execution requests.

8. A computer system according to claim 5, wherein said control means incorporated in said IOP includes means responsive to a request for execution of I/O operation for any one of said memory areas which request is outputted by the channel command word designated by the I/O instruction issued by any one of the programs, for thereby sending through one of plural channel paths an activation signal to said input/output control unit together with a unit address determined for said auxiliary storage unit and a logical resource number determined for said one memory area, to thereby command execution of said I/O operation to said one memory area.

9. A computer system according to claim 8, wherein said input/output control unit includes means responsive to generation of a completion interruption by said auxiliary storage unit upon completion of the I/O operation designated by said IOP, to thereby send to said IOP said completed interruption, a relevant unit address and a relevant logical resource number by way of one of said plural channel paths.

10. A computer system according to claim 8, wherein said control means incorporated in said IOP further includes means responsive to the reserve request for any one of said memory areas which is outputted by the channel command word designated by the I/O instruction issued by any one of the programs, for thereby reserving one of plural channel paths which is designated by said channel command words, said auxiliary storage unit and the memory area designated by said channel command word.

11. A computer system according to claim 8, wherein said control means incorporated in said IOP further includes means responsive to a request for structuring a channel path group for any one of said memory areas, which request is outputted by the channel command word designated by the I/O instruction issued by any one of said programs, for thereby storing an identifier of said channel path group and a channel path mode for a set of plural channel paths which are to belong to said channel path group requested by said channel command word, said auxiliary storage unit and the memory area thereof designated by said channel command word.

12. In a computer system having a central processing unit, a main storage, at least one I/O device, which is represented by at least one subchannel to an operating system, the one subchannel being either dedicated to one of the operating systems or shared by plural ones of the operating systems, I/O instruction execution means for executing an I/O instruction which has been issued by a running operating system and which designates one subchannel assigned to said one I/O device in which an I/O operation is to be performed, and execution control means connected to said I/O instruction execution means and said one I/O device and responsive to a request from said I/O instruction execution means for controlling execution of the I/O operation to the one I/O device, an I/O method comprising the steps of:

assigning, under control of said control program, a plurality of resident areas of said main storage which do not overlap one another to said plurality of operating systems as main memories therefore, respectively;

responding by said I/O instruction execution means to an I/O instruction issued by a running one of said plural operating systems to thereby determine an address of said main memory assigned to said running operating system which participates in an I/O operation requested by said I/O instruction without intervention of said control program;

translating said address, using said execution control means, into an address of said main storage of said computer system without intervention of said control program; and executing said I/O operation by said execution control means using the address resulting from said address translation.

13. In a computer system having (1) a central processing unit, (2) a plurality of I/O devices, wherein a plurality of operating systems can simultaneously run under the control of a control program, each of said I/O devices being assigned with one of plural subchannels which is representative of said I/O device for one of said plural operating systems, said plurality of subchannels being allocated with a plurality of predetermined real interruption priority levels, respectively, each of said plural real interruption priority levels being reserved by one of said plural operating systems or shared by several ones of said plural operating systems, (3) I/O instruction execution means for executing an I/O instruction which has been issued by a running operating system and which designates one subchannel assigned to one of the plurality of I/O devices in which an I/O operation is to be performed, and (4) execution control means connected to said I/O instruction execution means and said plurality of I/O devices and responsive to a request from said I/O instruction execution means for controlling execution of the I/O operation to the one I/O device, wherein every time an interruption request indicating completion of the I/O operation is issued by any one of said plurality of I/O devices, said interruption request is registered in one of plural interruption request queues provided in correspondence to real interruption priority levels determined previously for said plurality of I/O devices, respectively, said one interruption request queue being provided in correspondence to a real interruption priority level assigned to said I/0 device issued said interruption request, a method of executing an interruption request test instruction using said central processing unit, comprising steps of:

responding by said I/O instruction execution means to an interruption request test instruction issued by one of the running operating systems to thereby check whether or not the real interruption priority level reserved by said one running operating system exists in said plurality of real interruption priority levels; and executing said interruption request test instruction using said execution control means when said reserved real interruption priority level exists, without issuing interruption to said control program.

14. An interruption request test instruction executing method according to claim 13, wherein execution of said interruption request test instruction includes the steps of:

checking whether or not at least one interruption request is registered in one of said plural interruption request queues which is provided in correspondence to said reserved real interruption priority level;

responding to existence of said registered interruption request for thereby making a decision as to whether or not an interruption mask determined by said running operating system for one of a plurality of virtual interruption priority levels provided for said running operating system which corresponds to said real interruption priority level is in the state allowing the interruption; and informing said running operating system of said one interruption as a result of execution of said instruction when said interruption mask is decided to be in the state allowing the interruption.

15. In a computer system comprising a central processing unit, at least one I/O device, an auxiliary storage unit, a IOP for scheduling execution of an I/O operation designated by an I/O instruction issued by one of plural programs which use said auxiliary storage unit, I/O instruction execution means for executing an I/O instruction which has been issued by a running operating system and which designates one subchannel assigned to said one I/O device in which an I/O operation is to be performed, execution control means connected to said I/O instruction execution means and said I/O device and responsive to a request from said I/O instruction execution means for controlling execution of the I/O operation to the one I/O device, and an input/output control unit which responds to a result of execution of said I/O instruction for thereby executing an I/O operation requested by said I/O instruction for said auxiliary storage unit, wherein a plurality of operating systems can simultaneously run under the control of a control program, a method of executing an I/O instruction using said central processing unit, comprising steps of:

dividing, under the control of said control program, a memory area of said auxiliary storage unit into a plurality of memory areas which do not overlap one another;

assigning, under the control of said control program, said plurality of memory areas to said plurality operating systems such that at least one memory areas is reserved by at least one operating system;

checking, under the control of said control program, whether any one of said memory areas is reserved by any one of said operating systems and storing, when said memory areas is occupied, an identifier associated with the operating system reserving said memory area in a control block provided in correspondence to said memory area being reserved;

responding by said I/O instruction execution means to an I/O instruction issued by the running operating system to thereby make a decision as to whether the memory area designated by said I/O instruction is reserved by said running operating system on the basis of content of the control block stored in correspondence to said designated memory area; and executing said I/O instruction using said execution control means and without interrupting said control program when the memory area designated by said I/O instruction is reserved by said running operating system.

* * * * *